(12) United States Patent
Winarski

(10) Patent No.: US 10,977,232 B2
(45) Date of Patent: Apr. 13, 2021

(54) BLOCKCHAIN DIGEST AUGMENTATION OF TAPE CARTRIDGES VIA A SOLID-STATE CARTRIDGE MEMORY

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 49 days.

(21) Appl. No.: 16/548,198

(22) Filed: Aug. 22, 2019

(65) Prior Publication Data

US 2020/0336295 A1 Oct. 22, 2020

Related U.S. Application Data

(60) Provisional application No. 62/836,262, filed on Apr. 19, 2019.

(51) Int. Cl.
| | |
|---|---|
| *G06F 16/22* | (2019.01) |
| *G06F 16/23* | (2019.01) |
| *H04L 9/06* | (2006.01) |
| *G11B 5/78* | (2006.01) |

(52) U.S. Cl.
CPC ...... *G06F 16/2255* (2019.01); *G06F 16/2365* (2019.01); *G11B 5/78* (2013.01); *H04L 9/0637* (2013.01)

(58) Field of Classification Search
CPC ............... H04L 9/0637; G06F 16/2365; G06F 16/2255; G11B 5/78
See application file for complete search history.

(56) References Cited

U.S. PATENT DOCUMENTS

| | | | |
|---|---|---|---|
| 7,864,478 B2 | 1/2011 | Anna et al. | |
| 10,101,949 B2 | 10/2018 | Bates et al. | |
| 2019/0079690 A1* | 3/2019 | Asmussen | G06F 3/0641 |
| 2020/0005912 A1* | 1/2020 | Saliman | H04L 63/04 |

FOREIGN PATENT DOCUMENTS

WO    2018177662 A1    10/2018

OTHER PUBLICATIONS

Bonatti et al., "Transparent personal data processing: The road ahead," International Conference on Computer Safety, Reliability, and Security. Springer, Cham, 2017. (Year: 2017).*

* cited by examiner

*Primary Examiner* — Jay A Morrison
(74) *Attorney, Agent, or Firm* — The Winarski Firm, PLLC

(57) ABSTRACT

A magnetic tape cartridge secured with a blockchain is disclosed. The magnetic tape cartridge includes a solid-state cartridge memory, a reel of magnetic tape containing data, and a blockchain having a series of blocks. Each block in the blockchain contains a hash digest based on a portion of the data stored on the reel of magnetic tape and data pointers that link that portion of data stored on the reel of magnetic tape to each respective block. The blockchain blocks are stored in the solid-state cartridge memory. The portion of data upon which the hash digest is based is not redundantly stored in the solid-state cartridge memory with the block. The portion of data may be a logical volume, a logical partition, or all data stored on the reel of magnetic tape. The magnetic tape cartridge may also include a table containing pages stored within the solid-state cartridge memory with one of the pages being allocated for containing the blockchain.

20 Claims, 22 Drawing Sheets

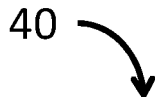

| Name 41 | P/U 42 | R/O 43 | Page ID (Hex) 44 | Length (Bytes) 45 | Description 46 |
|---|---|---|---|---|---|
| Cartridge Manufacturer's Information | P | RU | (001) | 64 | |
| Media Manufacturer's Information | P | O | (002) | 64 | |
| Initialization Data | U | RI | (101) | 64 | |
| Tape Write Pass | U | RI | (102) | 48 | |
| Tape Directory | U | RI | (103) | 1552 | |
| EOD Information | U | RI | (104) | 64 | |
| Cartridge Status and Tape Alert Flags | U | RI | (105) | 32 | |
| Mechanism Related | U | O | (106) | 384 | |
| Suspended Append Writes | U | RI | (107) | 128 | |
| Usage Information 0<br>Usage Information 1<br>Usage Information 2<br>Usage Information 3 | U | O | (108)<br>(109)<br>(10A)<br>(10B) | 64 | Table shall contain 0 or 4 consecutive Usage Information Pages. |
| Tape Blockchain Application Specific | U | O | (200) | 1056 | |
| Pad | PU | O | (FFC) | - | Used to reserve space for future pages, and to align some pages to 16-Byte and 32-Byte boundaries. |
| Defect | PU | O | (FFD) | - | Used to indicate LTO CM contains defective memory locations in that area. |
| Empty | PU | O | (FFE) | 0 | Indicates empty table. |
| EOPT | PU | RU | (FFF) | 0 | End-Of-Page Table. |

| Field 51 | R/O 52 | Offset 53 | Bytes 54 | Description 55 |
|---|---|---|---|---|
| Page ID | RI | 0 | 2 | This field is set to (0200h) indicating the Application Specific Page |
| Page Length | RI | 2 | 2 | This field is set to (0420h) which indicates the length of this Page (1056 decimal). |
| Tape Blockchain Application Data | O | 4 | 1024 | This field contains Tape Blockchain Application Data. (The content of this field is not defined in ECMA-319) |
| Reserved | RI | 1028 | 24 | These bytes shall be set to all (00) |
| CRC | RI | 1052 | 4 | This field specifies the CRC generated over bytes 0 to 1051 of this Page. |

| Field | Address | Bytes |
|---|---|---|
| LTO CM Manufacturer's Information | 0 | 32 |
| LTO CM Write Inhibit | 32 | 4 |
| Protected Page Table | 36 | 28 |
| Cartridge Manufacturer's Information Page | 64 | 64 |
| Media Manufacturer's Information Page | 128 | 64 |
| Unprotected Page Table | 192 | 64 |
| Initialization Data Page | 256 | 64 |
| Tape Write Pass Page | 320 | 48 |
| Tape Directory Page | 368 | 1552 |
| EOD Information Page | 1920 | 64 |
| Cartridge Status and Tape Alert Flags Page | 1984 | 32 |
| Usage Information page (1) | 2016 | 64 |
| Usage Information page (2) | 2080 | 64 |
| Usage Information page (3) | 2144 | 64 |
| Usage Information page (4) | 2208 | 64 |
| Mechanism Related Page | 2272 | 384 |
| Tape Blockchain Application Specific Page | 2656 | 1056 |
| Suspend Append Write Page | 3712 | 128 |

| T-Block Byte 8 71C | Description 72C |
|---|---|
| Byte 8: 0h-FFh | |
| 20h | SHA-224 algorithm identifier for all data in tape cartridge. |
| 21h | SHA-256 algorithm identifier for all data in tape cartridge. |
| 22h | SHA-384 algorithm identifier for all data in tape cartridge. |
| 23h | SHA-512 algorithm identifier for all data in tape cartridge. |
| 24h | SHA-512/224 algorithm identifier for all data in tape cartridge. |
| 25h | SHA-512/256 algorithm identifier for all data in tape cartridge. |
| 26h | MD5 algorithm identifier for all data in tape cartridge. |
| ... | |
| Fah | Encryption Key and Link to Encrypted Cloud-based Hash Digest and Identification of hash algorithm used for a volume within a tape cartridge. |
| FBh | Encryption Key and Link to Encrypted Cloud-based Hash Digest and Identification of hash algorithm used for a logical partition stored within a tape cartridge. |
| FCh | Encryption Key and Link to Encrypted Cloud-based Hash Digest and Identification of hash algorithm used for all data in tape cartridge. |
| FDh | Use link provided for both hash algorithm used and resulting digest for a volume within a tape cartridge. |
| Feh | Use link provided for both hash algorithm used and resulting digest for a logical partition stored within tape cartridge. |
| FFh | Use link provided for both hash algorithm used and resulting digest used for all data in tape cartridge. |

| T-Block Bytes 9.... 71D | Description 72D |
|---|---|
| Bytes 9...<br><br><br><br>Bytes 9-36<br>Bytes 9-40<br>Bytes 9-56<br>Bytes 9-72<br>Bytes 9-24 | Encryption Key and Link to Encrypted Cloud-based Hash Digest and Identification of hash algorithm used (when Byte-0 = FAh-FCh). Link to Cloud-based Hash Digest and identification of hash algorithm used (when Byte-0 = FDh-FFh).<br>SHA-224 and SHA-512/224 digests (224 bits or 28-Bytes)<br>SHA-256 and SHA-512/256 digests (256 bits or 32-Bytes)<br>SHA-384 digest (384 bits or 48-Bytes)<br>SHA-512 digest (512 bits or 64-Bytes)<br>MD-5 digest    (128 bits or 16-Bytes) |
| Bytes 37-42<br>Bytes 41-46<br>Bytes 57-62<br>Bytes 73-78<br>Bytes 25-30 | Data Pointer: 6 Bytes<br>For SHA-224 and SHA-512/224 digests<br>For SHA-256 and SHA-512/256 digests<br>For SHA-384 digest<br>For SHA-512 digest<br>For MD-5 digest |
| 43<br>47<br>63<br>79<br>31 | Logical End of T-Block Byte: BC (1011 1100)<br>For SHA-224 and SHA-512/224 digests<br>For SHA-256 and SHA-512/256 digests<br>For SHA-384 digest (completes two 32-Byte blocks)<br>For SHA-512 digest<br>For MD-5 digest (completes the 32-Byte block) |
| 44-63<br>48-63<br>80-95 | Optional Pad Bytes so that T-Block fills an integral number of 32-Byte blocks in the cartridge memory.<br>SHA-224 and SHA-512/224 digests (two 32-Byte blocks)<br>SHA-256 and SHA-512/256 digests (two 32-Byte blocks)<br>SHA-512 digest (three 32-Byte blocks) |

FIG. 7D

| T-Block 81 | Number of 32-Byte Blocks 82 | Application Data Bytes Used 83 |
|---|---|---|
| 1 | 2 | 64 |
| 2 | 2 | 128 |
| 3 | 2 | 192 |
| 4 | 2 | 256 |
| 5 | 2 | 320 |
| 6 | 2 | 384 |
| 7 | 2 | 448 |
| 8 | 2 | 512 |
| 9 | 2 | 576 |
| 10 | 2 | 640 |
| 11 | 2 | 704 |
| 12 | 2 | 768 |
| 13 | 2 | 832 |
| 14 | 2 | 896 |
| 15 | 1 | 928 |
| 16 | 3 | 1024 |

| T-Block ID 94 | HASH Digest and Data Pointer in T-Block 95 |
|---|---|
| 1 | *HASH Digest in T-Block-1 is the hash of Volume-1 (91)<br><br>*DATA–pointer to Volume-1 (91) stored on tape reel (13) |
| 2 | *HASH Digest in T-Block-2 is the hash of Volume-2 (92) and T-Block-1<br><br>* DATA–pointer to Volume-2 (92) stored on tape reel (13) |
| 3 | *HASH Digest in T-Block-3 is of the hash of Volume 3 (93) and T-Block-2<br><br>*DATA–pointer to Volume-3 (93) stored on tape reel (13) |

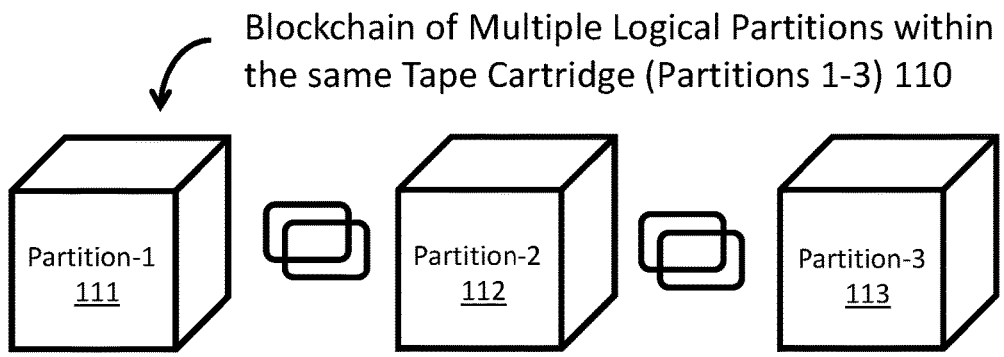

| T-Block ID 114 | HASH Digest and Data Pointer in T-Block 115 |
|---|---|
| 1 | *HASH Digest in T-Block-1 is the hash of all contents within Partition-1 (111)<br><br>*DATA-pointer to Partition-1 (111) stored on tape reel (13) |
| 2 | *HASH Digest in T-Block-2 is the hash of all contents within Partition-2 (112) and T-Block-1<br><br>*DATA-pointer to Partition-2 (112) stored on tape reel (13) |
| 3 | *HASH Digest in T-Block-3 is the hash of all contents within Partition-3 (113) and T-Block-2<br><br>*DATA-pointer to Partition-3 (113) stored on tape reel (13) |

FIG. 11

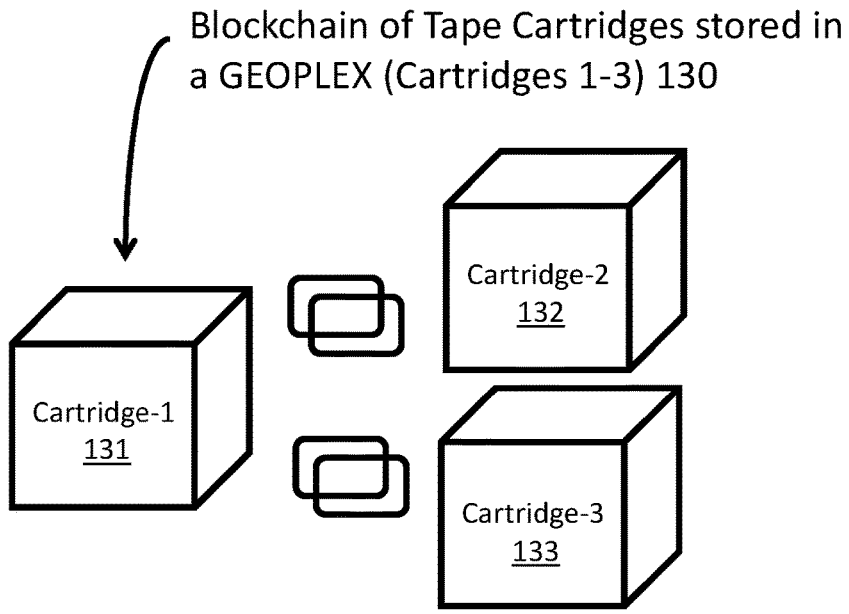

| T-Block ID 134 | HASH Digest and Data Pointer in T-Block 135 |
|---|---|
| 1 | *HASH Digest in T-Block-1 of Cartridge 1 is the hash of all the data in Cartridge-1 (131)<br>*DATA-pointer to information in Cartridge-1 (131) stored on tape reel (13) |
| 2 | *HASH Digest in T-Block-1 of Cartridge 2 (132) is the hash of all the data copied from Cartridge-1 (131) into Cartridge 2 (132) and T-Block-1 of Cartridge 1<br>*DATA-pointer to information in Cartridge-2 (132) stored on tape reel (13) |
| 3 | *HASH Digest in T-Block-1 of Cartridge 3 (133) is the hash of all the data copied from Cartridge-1 (131) into Cartridge 3 (133) and T-Block-1 of Cartridge 1<br>*DATA-pointer to information in Cartridge-3 (133) stored on tape reel (13) |

FIG. 13

Blockchain of Volume Spanning across a group of Tape Cartridges (Cartridges 1-3) 140

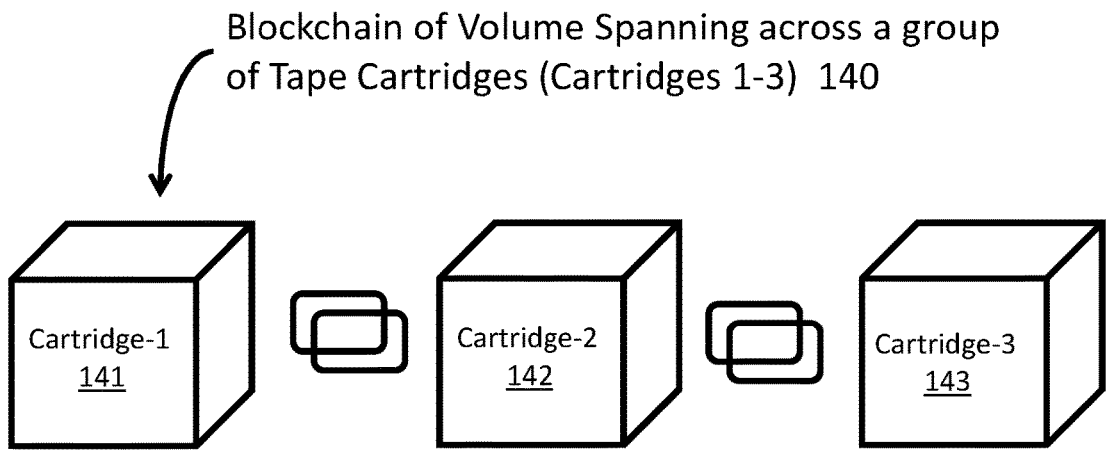

| T-Block ID 144 | HASH Digest in T-Block 145 |
|---|---|
| 1 | *HASH Digest in T-Block-1 of Cartridge 1 is the hash of all the data in Cartridge-1 (151)<br>*DATA-pointer to information in Cartridge-1 (151) stored on tape reel (13) |
| 2 | *HASH Digest in T-Block-1 of Cartridge 2 (152) is the hash of all the data in Cartridge 2 (152) and T-Block-1 of Cartridge 1<br>*DATA-pointer to information in Cartridge-2 (152) stored on tape reel (13) |
| 3 | *HASH Digest in T-Block-1 of Cartridge 3 (153) is the hash of all the data in Cartridge 3 (153) and T-Block-1 of Cartridge 1<br>*DATA-pointer to information in Cartridge-3 (153) stored on tape reel (13) |

| T-Block 151 | Bytes 152 | Total Bytes 153 | Description 154 |
|---|---|---|---|
| 01h | 1 | 1 | ID number of T-Block |
| 20190315 | 4 | 5 | Date Stamp (YYYY:MM:DD) |
| 105506 | 3 | 8 | Time Stamp (HH:mm:SS) |
| 26h | 1 | 9 | MD5 algorithm applied to entire tape cartridge |
| DCB1 985D ACD3 03FA BCDE 0A46 A78F 130C | 16 | 25 | 16-Byte MD5 Hash Digest |
| DA17EC | 6 | 31 | Six-Byte Data-Pointer |
| BC | 1 | 32 | Logical End of T-Block Byte |

FIG. 15

BLOCKCHAIN DIGEST AUGMENTATION OF TAPE CARTRIDGES VIA A SOLID-STATE CARTRIDGE MEMORY

FIELD OF THE INVENTION

The present disclosure relates to the field of data integrity technology utilized in combination with data storage on magnetic tape cartridges.

BACKGROUND

The world's first tape storage system was introduced in 1951, the UNISERVO tape drive for the UNIVAC computer. Since that time, computer data storage has included other diverse technologies like magnetic floppy disks, magnetic hard drives, optical drives, and solid-state drives. The core technological goal for each of these technologies is to maintain data integrity for future access. Technological advances in material science, data storage, and software have fueled advances in storage capacities and data read/write access speeds for these various storage technologies. However, despite all of the technological gains with these other storage mediums, magnetic tape remains a popular and preferred way to backup data. When a software bug destroyed the email boxes of GMAIL® users in 2011, GOOGLE® turned to tape to restore the data. Other companies and government organizations have encountered similar circumstances and continue to rely on magnetic tape for storage backup and disaster recovery. The reason is that magnetic tape remains inexpensive, the data on a tape remains accessible longer than on other media, and tape is remarkably easy to use and manage, while offering security benefits.

One simple reason for the desirability of magnetic tape is longevity. A typical hard drive will operate only about three to five years before failing. Portable disk storage technologies such as CDs and DVDs generally hold data for 10 to 25 years. Solid-state storage degrades with use, rather than with age. Technological advancements are likely to only produce marginal gains in the longevity of these various storage mediums. However, magnetic tape, stored under ideal conditions, can last at least 30 to 50 years.

Another reason for the high desirability of magnetic tape is its sheer storage capacity. In 2017, IBM® and SONY® announced the creation of palm sized magnetic tape storage cartridges having a storage capacity of 330 terabytes, vastly dwarfing the storage capacity of hard drives and solid-state drives. Advancements in magnetic tape technologies are expected continue to out-pace other storage technologies allowing for the development of larger storage capacities providing the long-term data storage solution that the modern data driven economy needs. As noted in 2018 by the Institute of Electrical and Electronics Engineers (IEEE®), magnetic tape may prove the last technology that continues to follow Moore's law. It is desirable to develop new data integrity strategies in combination with the increasing storage densities of magnetic tape to ensure data integrity for future technological generations.

Blockchain is one technology is finding increasing use for insuring the error-free transfer of information. A hash algorithm takes input and converts it to, at a very high probability, a unique series of digits called a hash digest. The more digits in this hash digest, the less likely that there would be a collision, where different input had the same hash digest. The hash function demonstrates the avalanche effect, where a tiny change in the input, no matter how small, creates a significant change to the output digest. Combining blockchain with magnetic tape offers one solution for providing data integrity for future technological generations.

SUMMARY OF THE INVENTION

The present specification discloses a magnetic tape cartridge secured with a blockchain. The magnetic tape cartridge includes a solid-state cartridge memory, a reel of magnetic tape containing data, and a blockchain having a series of blocks. Each block in the blockchain contains a hash digest based on a portion of the data stored on the reel of magnetic tape and data pointers that link that portion of data stored on the reel of magnetic tape to each respective block. The blockchain blocks are stored in the solid-state cartridge memory. The portion of data upon which the hash digest is based is not redundantly stored in the solid-state cartridge memory with the block. The portion of data may be a logical volume, a logical partition, or all data stored on the reel of magnetic tape. The magnetic tape cartridge may also include a table containing pages stored within the solid-state cartridge memory with one of the pages being allocated for containing the blockchain. This table is compliant with the Linear Tape-Open (LTO) standard. The page allocated for blockchain data is an application specific page that is left open within the LTO standard. The blockchain contains an algorithm identifier identifying a hash algorithm used to hash the portion of the data from the reel of magnetic tape such as SHA-224, SHA-256, SHA-384, SHA-512, SHA-512/224, SHA-512-256, and MD5. Alternatively, the blockchain contains an encryption key and link to an encrypted cloud-based hash digest and an identification of a hash algorithm used to hash the portion of the data from the reel of magnetic tape. Each blockchain block contains a logical end byte and pad bytes. The storage of the blockchain within the table forms a ledger recording information about the data on the reel of magnetic tape. A genesis block starts the blockchain and each block after the genesis block contains a hash digest based on the portion of the data stored on the reel of magnetic tape and a previous block.

The present specification also discloses a method for maintaining data integrity on a magnetic tape cartridge. The method includes storing data on a magnetic tape reel of a magnetic tape cartridge and creating a hash digest based on a portion of the data from the magnetic tape reel. The method also generates a data pointer linking to the portion of the data on the magnetic tape reel and forms a blockchain block including the hash digest and the data pointer. Then the method stores the blockchain block within a solid-state cartridge memory of the magnetic tape cartridge. The blockchain block is stored within the solid-state cartridge memory of the magnetic tape cartridge without redundantly storing the portion of data within the solid-state cartridge memory. This method stores the blockchain block in a page contained within a table stored within the solid-state cartridge memory of the magnetic tape cartridge. This table is compliant with the Linear Tape-Open (LTO) standard where the page allocated for blockchain data is an application specific page that is left open within the LTO standard. The data stored on the reel of magnetic tape is stored with an LTO format that is not altered by the blockchain due to the storage of the blockchain in the solid-state cartridge memory and the use of data pointers to link to the data on the reel of magnetic tape to the blockchain. The portion of data may be a logical volume, a logical partition, or all data contained within the magnetic tape reel. The method may also store within the blockchain block an algorithm identifier identifying a hash algorithm used to hash the portion of the data from the reel of magnetic tape such as SHA-224, SHA-256, SHA-384, SHA-512, SHA-512/224, SHA-512-256, and MD5. Alternatively, the method may store within the blockchain block an encryption key and link to an encrypted cloud-based hash digest and an identification of a hash algorithm used to hash the portion of the data from the reel of magnetic tape. Then for confirming data integrity, the method will place the magnetic tape cartridge into a magnetic tape cartridge reader and read the blockchain block from solid-state cartridge memory the into the memory of the magnetic tape cartridge reader. The method will also access the hash digest and data pointer included within the blockchain block and use the accessed data pointer to access the linked portion of data stored on the magnetic tape reel. Next, the method will read the portion of data stored on the magnetic tape reel into the memory of the magnetic tape cartridge reader and generate a new hash digest of the portion of data read into the memory of the magnetic tape cartridge reader. Then, the method will compare the new hash digest generated by the magnetic tape cartridge reader to the hash digest included within the blockchain block. At this point the method may approve the portion of data for use when the new hash digest generated by the magnetic tape cartridge reader matches the hash digest included within the blockchain block. Alternatively, the method may generate an error message when the new hash digest generated by the magnetic tape cartridge reader does not match the hash digest included within the blockchain block.

The present specification also discloses a geographically diverse magnetic tape cartridge GEOPLEX system secured with blockchain for data disaster recovery. The GEOPLEX system includes a first magnetic tape cartridge located at a first geographic location and a second magnetic tape cartridge located at a second geographic location. The first magnetic tape cartridge has a first solid-state cartridge memory, a first reel of magnetic tape containing data, and a first blockchain block stored in the first solid-state cartridge memory. The first blockchain block contains a first hash digest of the data stored on the first reel of magnetic tape and a data pointer linking to the data stored on the first reel of magnetic tape. The second magnetic tape cartridge has a second solid-state cartridge memory, a second reel of magnetic tape containing data, and a second blockchain block stored in the second solid-state cartridge memory. The second blockchain block contains a second hash digest based on the data stored on the second reel of magnetic tape and the first blockchain block. The second blockchain block also contains a data pointer linking to the data stored on the second reel of magnetic tape. The data upon which the first hash digest is based is not redundantly stored in the first solid-state cartridge memory with the first blockchain block. The data upon which the second hash digest is based is not redundantly stored in the second solid-state cartridge memory with the second blockchain block. The first magnetic tape cartridge has a first table stored in the first solid-state cartridge memory that is compliant with the Linear Tape-Open standard. The first blockchain block is stored in the table in an application specific page. The second magnetic tape cartridge has a second table stored in the second solid-state cartridge memory that is compliant with the Linear Tape-Open standard. The second blockchain block is stored in the second table in an application specific page. The first blockchain block contains an algorithm identifier identifying a hash algorithm used to hash the data from the first reel of magnetic tape such as SHA-224, SHA-256, SHA-384, SHA-512, SHA-512/224, SHA-512-256, and MD5. Alternatively, the first blockchain block contains an encryption key and link to an encrypted cloud-based hash digest and an identification of a hash algorithm used to hash the data from the first reel of magnetic tape. The second blockchain block contains an algorithm identifier identifying a hash algorithm used to hash the data from the second reel of magnetic tape such as SHA-224, SHA-256, SHA-384, SHA-512, SHA-512/224, SHA-512-256, and MD5. Alternatively, the second blockchain block contains an encryption key and link to an encrypted cloud-based hash digest and an identification of a hash algorithm used to hash the data from the second reel of magnetic tape. The first and second geographic locations are separated by at least 100 miles. The GEOPLEX system may also include a magnetic tape cartridge reader that accesses the data stored on the first reel of magnetic tape and the first blockchain block stored on the first solid-state cartridge memory. The magnetic tape cartridge reader forms a new hash digest of the data stored on the first reel of magnetic tape and compares it to the first hash digest contained within the first blockchain block. The magnetic tape cartridge reader approves the data for use from the new hash digest and first hash digest match. The magnetic tape cartridge reader accesses the second magnetic tape cartridge for data retrieval when the new hash digest and first hash digest do not match.

This disclosed blockchain technology may be employed to guard the integrity of data organized in an individual magnetic tape cartridge, or a Redundant Array of Independent Tapes (RAIT) formed of multiple magnetic tape cartridges, which is the tape equivalent of a disk RAID. This blockchain technology may be employed for a plurality of tapes storing a single large dataset, in what is called volume-spanning. This blockchain technology may be employed in what is called a GEOPLEX, to ensure redundant copies of data are stored on identical tape cartridges, copied from a parent tape cartridge, in strategic locations worldwide in case of natural disasters or for speed of access. This blockchain technology may be employed within a single tape cartridge for all the data stored within that tape cartridge. This blockchain technology may be selectively used within individual logical partitions that compartmentalize the tape cartridge. This blockchain technology may be used to track changes made to data read and uploaded from a physical tape cartridge to a virtual tape server for processing and then downloaded and written back to the physical tape cartridge, so that the data sent by the virtual tape server is indeed the data stored on the tape cartridge. This blockchain technology may be used to ensure that a tape cartridge physically shipped to a location is received with the same data that it had when it as shipped. This blockchain technology may be used to ensure tape "read data" verify operations, such as a write-verify "read data" which is done immediately after data is written to tape cartridge (hence the name write-verify), and a separate read-verify "read data" done some time after the completion of the write process done to check the integrity of the long-term stored data, both with a process called BlockChainVerify. Blockchain could be used to ensure the contents of cartridge memories across a population of related tape cartridges. Blockchain could be used to ensure the immutability of data stored in write-once, read-many "WORM" tape cartridges. Lastly, blockchain technology may be used to ensure that the data backed up from a server is indeed the data written to the tape cartridges, and that the data read from tape cartridges is indeed the data restored to the server, in support of the important backup-restore function. This disclosed blockchain technology is combined in one embodiment with an implementation of the format of the solid-state cartridge memory in the Linear Tape Open (LTO) Ultrium tape cartridge. This allows I/O and transportability of the "removable media" tape cartridge while under the protection of blockchain. This blockchain technology can then be exploited by the storage system containing an LTO tape drive. This LTO tape drive may be contained within a robotic library that uses automation to service LTO tape cartridges between library storage slots and LTO tape drives. This specification melds the Linear Tape Open format and Blockchain hash technology, to provide a standards-compatible implementation, such as compatibility with Standard ECMA-319 12.7 mm—384-Track Magnetic Tape Cartridges—Ultrium-1 Format (June 2001) which is hereby incorporated by reference in its entirety. The underlying idea behind this specification is to utilize blockchain technology to secure the data stored on a magnetic tape cartridge. There are a variety of specific technological implementations that can execute this idea of utilizing blockchain to secure data stored on a magnetic tape cartridge. In one exemplary specific technological implementation of this idea, all data to be stored on a magnetic tape reel is formulated into a blockchain where segments of the data are placed in individual blocks with interlinking hashes. This blockchain formatted data is then stored on the magnetic tape reel such that the data and blockchain are in a single unitary format that is stored entirely on the magnetic tape. In contrast, the present invention stores blockchain hash digests with accompanying data pointers in individual blockchain blocks in the solid-state memory cartridge of the magnetic tape cartridge where the data is stored entirely separately on the magnetic tape reel. The data pointers associated with specific hash digests stored in individual blockchain blocks link to the data stored on the magnetic tape reel. The data on the magnetic tape reel is not altered into a blockchain format. Thus, there are multiple specific technological implementations for combining blockchain with data on magnetic tape cartridges. Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 4 illustrates a table defining the LTO 4 KB Cartridge Memory page definitions;

FIG. 5 illustrates a table defining the tape blockchain application specific page for the LTO 4 KB Cartridge Memory;

FIG. 6 illustrates a table of an example byte-map of the LTO 4 KB Cartridge Memory;

FIG. 7C, a continuation of FIG. 7B, illustrates Byte-8 of a T-block in the tape blockchain application data of the tape blockchain application specific page within the LTO Cartridge Memory;

FIG. 7D, a continuation of FIG. 7C, illustrates a T-block, starting at Byte-9, in the tape blockchain application data of the tape blockchain application specific page within the LTO Cartridge Memory;

FIG. 11 illustrates the blockchain of multiple logical partitions within the same tape cartridge (logical partitions 1-3);

FIG. 13 illustrates the blockchain of tape cartridges stored in a GEOPLEX;

FIG. 14 illustrates the blockchain of volume spanning across a group of tape cartridges;

FIG. 15 illustrates a T-block for the blockchaining of entire tape cartridges stored in a GEOPLEX or for volume spanning;

DETAILED DESCRIPTION

Figure 1:
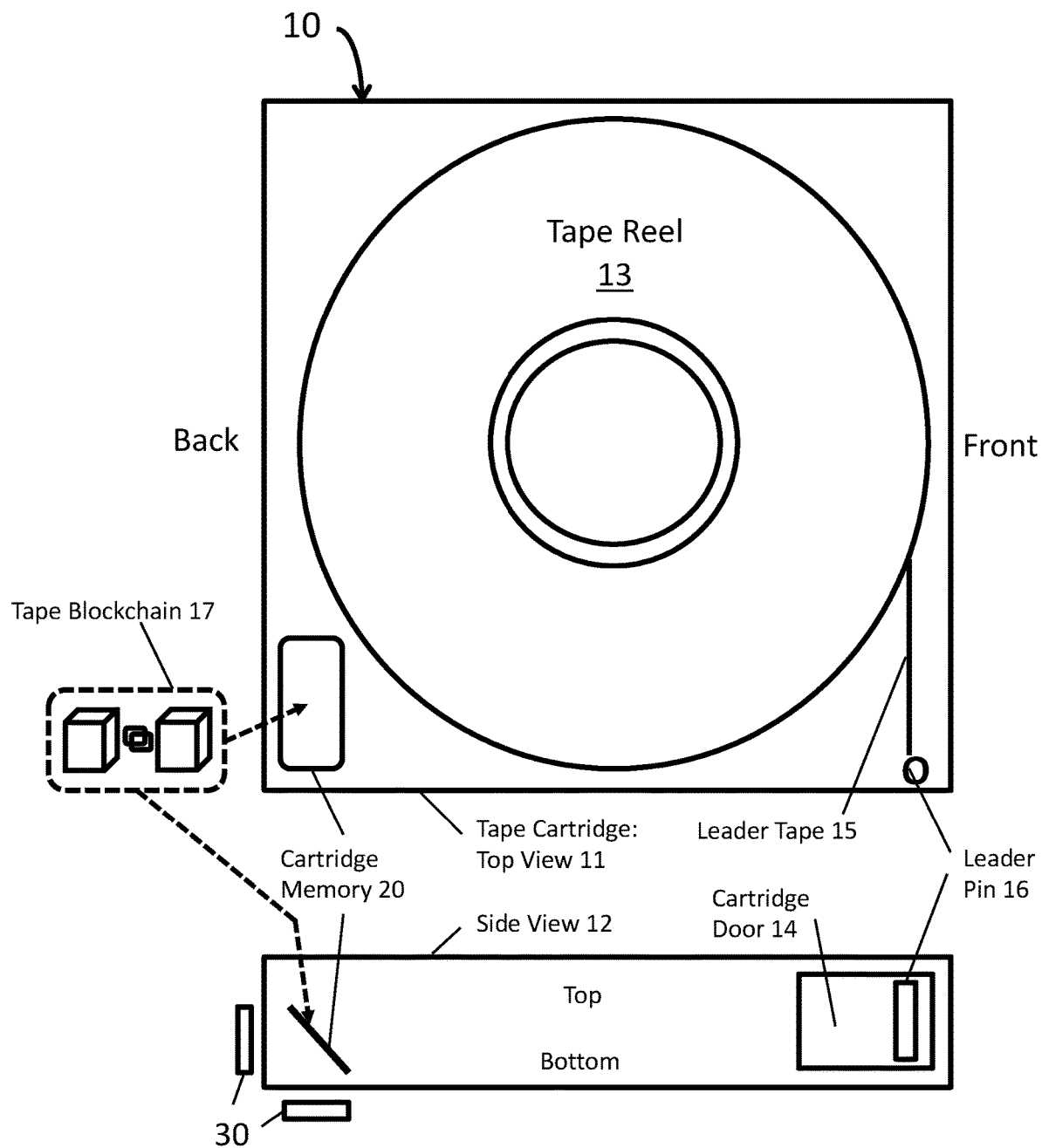
FIG. 1 illustrates top and side views of an LTO single-reel tape cartridge with Cartridge Memory with Tape Blockchain information.

While the invention has been shown and described with reference to a particular embodiment thereof, it will be understood to those skilled in the art, that various changes in form and details may be made therein without departing from the spirit and scope of the invention. FIG. 1 is a description of the Linear Tape Open (LTO) Ultrium single-reel tape cartridge 10 that includes data security provided by blockchain 17. Magnetic tape cartridge 10 has a cartridge memory "CM" 20 at a forty-five degree angle. FIG. 1 shows both top and side views of the LTO single-reel tape cartridge 10. In the top view of the cartridge 11, tape reel 13 is shown, along with the cartridge memory 20 in a back corner of the tape cartridge 10. Leader tape 15 is connected to leader pin 16. It is leader pin 16 that is used to thread the magnetic tape wound on tape reel 13 through the LTO tape drive to the machine reel that stays resident in the LTO tape drive for data transfer. In the side view of the tape cartridge 12, the forty-five degree angle of the cartridge memory 20 is shown, so that the cartridge memory may be wirelessly accessed by a wireless cartridge memory access device 30, shown in FIG. 2, through the bottom or top of the tape cartridge by an LTO tape drive, and through the back of the tape cartridge by the robotic picker of an automated library that moves tape cartridge 10 between library storage slots and LTO tape drives. Wireless cartridge memory access device 30 can access cartridge memory 20 to either write or read tape blockchain information 17. Cartridge door 14 is shown open, so that leader pin 16 is visible in the side view. Data is stored on tape reel 13 in a conventional format consistent with the LTO standard. The use of data pointers in blockchain 17 means that the format of data on reel of magnetic tape 13 does not have to be altered from its LTO format into a blockchain format. The use of data pointers in blockchain 17 and the fact that blockchain 17 is stored in solid-state cartridge memory 20 means it is possible to blockchain all data within tape reel 13 without having to subsequently go back and reformat all of the data on tape reel 13 into a blockchain format. A tape blockchain 17 is stored in solid-state cartridge memory 20. Blockchain 17 has a series of blockchain blocks. Each block in the blockchain contains a hash digest based on a portion of the data stored on the reel of magnetic tape 13 and data pointers that link that portion of data stored on the reel of magnetic tape 13 to each respective block. The blockchain blocks are stored in the solid-state cartridge memory 20. The portion of data upon which the hash digest is based is not redundantly stored in the solid-state cartridge memory 20 with the blockchain 17. The portion of data referenced by blockchain 17 may be a logical volume, a logical partition, or all data stored on the reel of magnetic tape 13.

Figure 2:
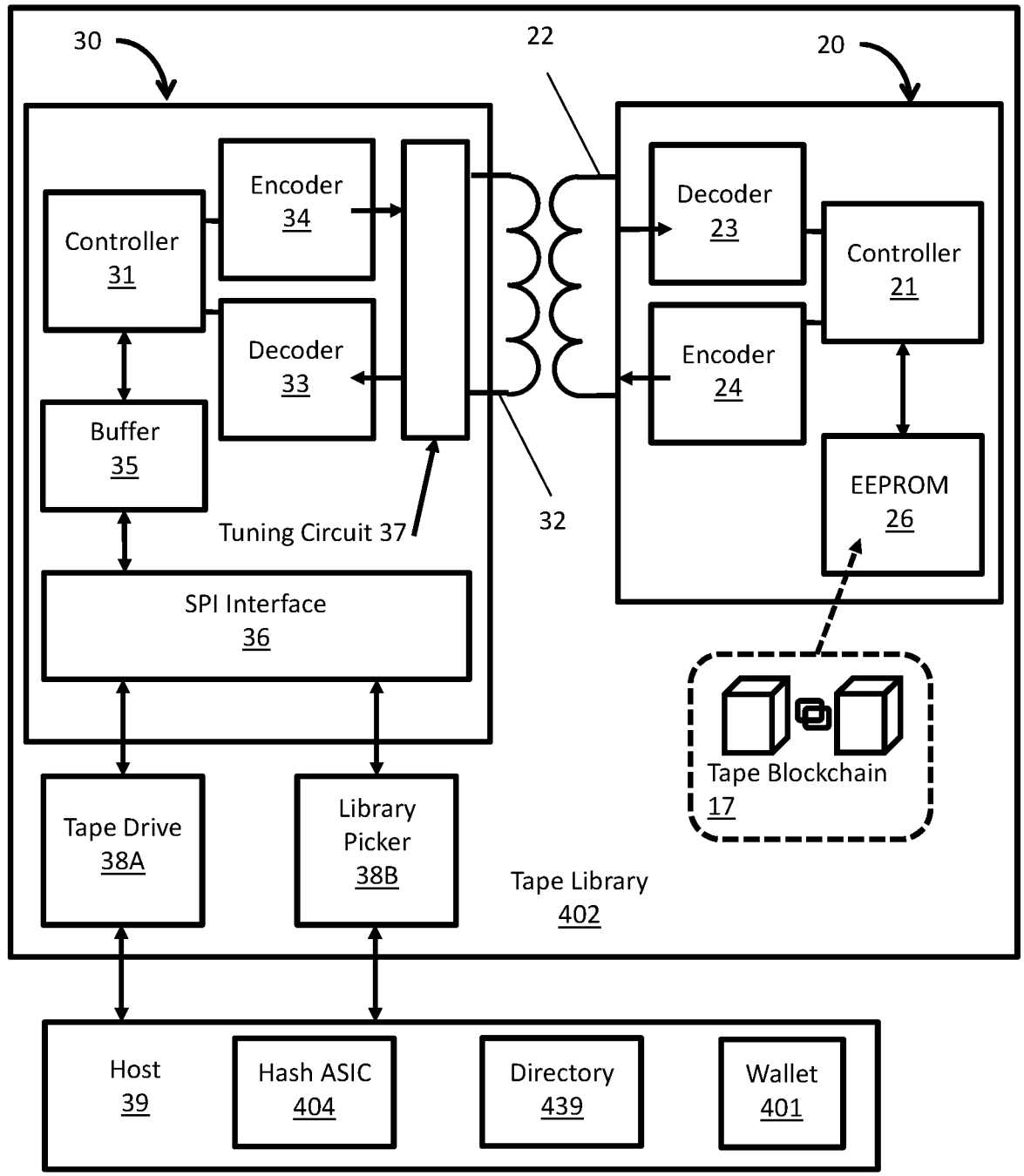
FIG. 2 illustrates a detailed diagram of a Cartridge Memory and a Cartridge Memory writer/reader with Tape Blockchain information.

FIG. 2 is a description of cartridge memory 20 that contains blockchain 17. Cartridge memory 20 contains controller 21, thin-film antenna 22, decoder 23, and encoder 24. The cartridge memory 20 also contains an electrically-erasable, programmable, read-only-memory "EEPROM" 26 that stores blockchain 17. The storage capacity of EEPROM 26 varies with the version of LTO. For LTO 1-3, the storage capacity is 4 KB, which is internally divided into 128 32-Byte blocks. For LTO 4-5, the storage capacity is just under 8 KB, which is internally divided into 255 32-Byte blocks. For LTO 6-7, the storage capacity is just under 16 KB, which is divided into 511 32-Byte blocks. I/O commands between the wireless cartridge memory access device and the cartridge memory itself include READ WORD (read a 2 Byte Word), READ BLOCK (read 8 Words, or 16 Bytes), READ BLOCK CONTINUE (reads next 8 Words, or 16 Bytes, to complete reading a 32-Byte block), WRITE WORD (write a 2-Byte Word), and WRITE BLOCK (write 8 words, or 16 Bytes, and if this is successful, write a second 8 words, or 16 bytes, to complete writing a 32 Byte block). It is within this EEPROM 26 that tape blockchain information 17 is stored.

A cartridge memory is also used in the IBM® 3592 single-reel tape cartridge. The ORACLE® STORAGETEK® T10000 and T10000-T2 single-reel tape cartridges also have a cartridge memory, called a Radio Frequency IDentification (RFID) chip. This invention equally applies to these tape cartridges.

Figure 3:
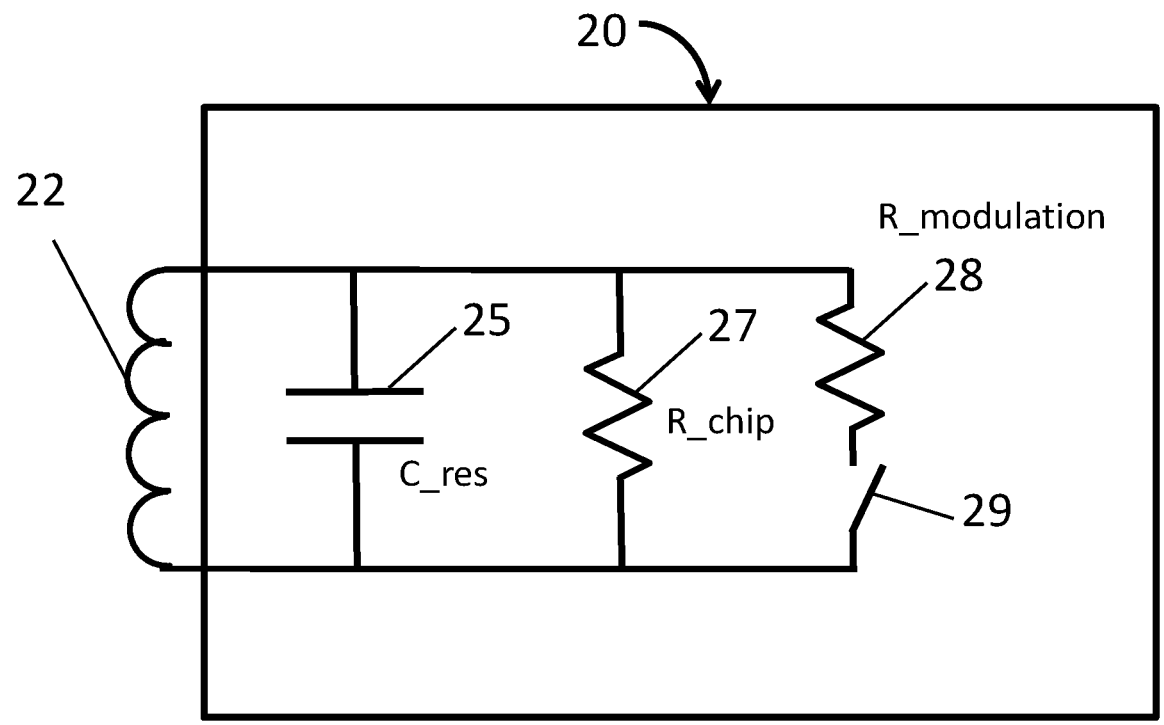
FIG. 3 illustrates a circuit diagram of an inductor-capacitor circuit in a Cartridge Memory (Prior Art)

FIG. 3 illustrates a prior art diagram of an electrical circuit within cartridge memory 20. This diagram comes out of ECMA-319, page 123. The cartridge memory 20 contains a capacitor C_res 25, which is electrically connected to the thin film antenna 22, which is an inductor. Thus this thin-film antenna 22 and capacitor 25 pair form what is known in electrical engineering as a harmonically-oscillating L-C circuit, one that is tuned to a frequency of 13,560 kHz±7 kHz, per page 119 of ECMA-319. Cartridge memory 20 is passive, as it does not have a battery for storing electric power. When a wireless cartridge memory access device 30, FIG. 2, is in close proximity to the cartridge memory 20, such as within twenty millimeters (20 mm), sufficient energy is generated in the antenna-capacitor "L-C" 22-25 circuit, which is electrically connected to EEPROM 26, to power both the wireless writing to the EEPROM and reading from the EEPROM without the need of a battery in cartridge memory 20. Also shown in FIG. 3 is R_chip 27, which represents the collective resistance of semiconductor chip in cartridge memory 20. Additionally, FIG. 3 shows R modulation 28 and switch 29 so that the energy in the antenna-capacitor "L-C" 22-25 circuit can be used to selectively read from or write to EEPROM 26.

FIG. 2 also includes wireless cartridge memory access device 30. Wireless cartridge memory access device 30 includes controller 31, antenna 32, decoder 33, encoder 34, buffer 35, and SPI interface 36. One wireless cartridge memory access device 30 may be located in the tape drive 38A, which conducts I/O with tape cartridge 10 and another wireless cartridge memory access device 30 may be located in the robotic library picker 38B, which transports tape cartridge 10 between library storage slots and tape drives 38A. A serial peripheral interface (SPI) is an interface that enables the serial (one bit at a time) exchange of data between two devices. An SPI operates in full duplex mode, meaning that data can be transferred in both directions at the same time. Via SPI interface 36, wireless cartridge memory access device 30 communicates with host 39 through either tape drive 38A, such as an LTO, IBM® 3592, or ORACLE® STORAGETEK® T10000D tape drive, or the robotic picker of library 38B, both of which may be within tape library 402. Directory 439 has a table of tape cartridges in library 402 and the names of the data volumes and partitions in each, allowing the library to know what tape cartridges 10 to mount in drives 38A for the desired I/O. Tuning circuit 37 targets the frequency range of 13,560 kHz±7 kHz of the thin-film antenna 22 and capacitor 25 "L-C" circuit of cartridge memory 20. For a write operation to EEPROM 26, the communications path is from encoder 34 to antenna 32, of wireless cartridge memory access device 30, to antenna 22 to decoder 23 to EEPROM 26 of cartridge memory 20. For a read operation from EEPROM 26, the communications path is from EEPROM 26 to encoder 24 to antenna 22, of cartridge memory 20, to antenna 32 to decoder 33 of wireless cartridge memory access device 30. Because cartridge memory 20 is at a forty-five degree angle, either a wireless cartridge memory access device 30 in a robotic picker holding tape cartridge 10 or a wireless cartridge memory access device 30 in a tape drive, either above or below tape cartridge 10, may access EEPROM 26 of cartridge memory 20.

FIG. 4 illustrates table 40 defining the LTO 4 KB Cartridge Memory Page Definitions modified for blockchain data, such as blockchain 17, for the information stored in EEPROM 26 of cartridge memory 20. Table 40 comes out of ECMA-319, page 99, except for the tape blockchain application specific page, which is newly added in this specification. While the 8 KB (LTO 4-5) and 16 KB (LTO 6-7) cartridge memories are larger than the 4 KB (LTO 1-3) memory, the Page definitions in table 40 are sufficient for the purposes of defining this invention. Column 41 of table 40 gives the name of the page, such as cartridge manufacturer's information, media manufacturer's information, initialization data, tape write pass, tape directory, EOD information, cartridge status and tape alert flags, mechanism related, suspended append write, usage information 0-3, tape blockchain application specific, pad, defect, empty, and EOPT (End-of-Page Table). It is within the application specific page that blockchain information will be stored, which allows the cartridge memory to be used consistent with the ECMA-319 specification. The magnetic tape cartridge 10 includes table 40 containing pages stored within the solid-state cartridge memory 20 with one of the pages being allocated for containing the blockchain 17. This table 40 is compliant with the Linear Tape-Open (LTO) standard. The page allocated for blockchain data 17 is an application specific page that is left open within the LTO standard.

Referring again to FIG. 4, column 42 of table 40 is the protect field. This protect field indicates whether a page may be located in the Protected (P), Unprotected (U), or either (PU) Page Table. The application specific page is unprotected, meaning that it may be updated as needed. Column 43 of table 40 and column 52 of table 50, FIG. 5, makes use of "RU," "RI," and "O" notation. "RU" specifies that a Page or a Field shall be required for both uninitialized and initialized cartridges. "RI" specifies that a Page or a Field shall be required for an initialized cartridge only. "O" specifies that a Page or Field is optional. The tape blockchain application specific page information is "O" in Table 40, but more detailed definition of this entry is given in table 50. Column 44 in table 40 gives the Page ID in hexadecimal. The page ID for the tape blockchain application specific page is listed as (200h), which is also referred to in Column 55 of table 50. Column 45 in table 40 gives the length of the page in bytes. The tape blockchain application specific page is defined as having a length of 1056 bytes, which is an allocation of just over a quarter of the capacity of the 4 KB cartridge memory. Finally, column 46 of table 40 gives descriptions of certain pages.

FIG. 5 illustrates table 50 defining the Application Specific Page for the LTO 4 KB Cartridge Memory that includes a tape blockchain application data field for storing blockchain 17. Table 50 comes out of ECMA-319, page 112, except for the tape blockchain application data field, which is newly added in this specification. Column 51 of table 50 indicates fields, such as Page ID, Page Length, Tape Blockchain Application Data (where blockchain information shown in FIGS. 7A, 7B, 7C, 7D, 10, 12, and 15 is stored), Reserved, and CRC. Column 52 shows that the tape blockchain application data is "O," meaning that the contents of this section are available for updating for such things as new hash digests or new links to hash digests. Column 53 gives the offset in bytes and Column 54 gives the length of the individual fields in column 51, in bytes. Column 55 of table 50 shows the Application Specific Page ID field is set to 0200h, the same value shown in Column 44, table 40. The Page Length field for the Tape Blockchain Application Specific Page in column 55 is set to 0420h bytes, which is 4*256+2*16 or 1056 decimal, which agrees with Column 45 of table 40. The final field, the 16-bit CRC (Cyclical Redundancy Check) begins at 1052 bytes (the offset, column 53) and is 4 bytes long (length, column 54), confirming a total of 1056 (1052+4) bytes in the application specific page. The CRC can be updated as the blockchain information in the tape blockchain application data changes.

The tape blockchain application data field in Column 51 is allocated 1024 bytes in Column 54, for any usage, which represents a quarter of the storage capacity of EEPROM 26. FIGS. 7A, 7B, 7C, and 7D show that a range of approximately 32 to 96 bytes are needed for inclusion of a T-Block in the tape blockchain application data field, depending on what hash algorithm is used, and depending upon the length of the link enclosed.

FIG. 6 illustrates table 60 defining an example Byte-map of the LTO 4 KB Cartridge Memory modified to include a tape blockchain application specific page that stores blockchain 17. Table 60, except for the tape blockchain application specific page, comes out of ECMA-319, page 114, which is newly added in this specification. The magnetic tape cartridge 10 includes table 40 containing pages stored within the solid-state cartridge memory 20 with one of the pages being allocated for containing the blockchain 17. This table 40 is compliant with the Linear Tape-Open (LTO) standard. The page allocated for blockchain data 17 is an application specific page that is left open within the LTO standard. Column 61 of table 60 gives the name of the fields, such as LTO CM manufacturer's information (cartridge memory "CM"), LTO CM write inhibit, protected page table, cartridge manufacturer's information page, media manufacturer's information page, unprotected page table, initialization data page, tape write pass page, tape directory page, EOD (End-of-Data) information page, cartridge status and tape alert flags page, usage information page (1), usage information page (2), usage information page (3), usage information page (4), mechanism related page, tape blockchain application specific page where block chain information will be stored, and suspend append write page. Column 62 gives address in bytes, and Column 63 gives length in bytes. The application specific page is shown as 1056 bytes in length, which is consistent with Column 45 of table 40 and Column 55 of table 50.

The blockchain information stored in the tape blockchain application data field (FIG. 5) of the application specific page (FIGS. 4 and 6) of the LTO Cartridge Memory 20 is organized into T-blocks. One T-block is illustrated in detail in table 70 in FIGS. 7A, 7B, 7C, and 7D.

Figure 7A:
FIG. 7A illustrates Bytes 0-7 of a T-block in the tape blockchain application data of the tape blockchain application specific page within the LTO Cartridge Memory.

Due to a large amount of content, T-block 70 is described across a series of four figures: FIG. 7A, FIG. 7B, FIG. 7C, and FIG. 7D. FIG. 7A describes the use of Byte-0 to Byte-7 in column 71A of T-block 70. The description of each byte is in column 72A. Byte-0 is the ID number of the T-block, in hexadecimal. Bytes 1-4 are a date stamp comprising year, month, and day in the form YYYY:MM:DD. Bytes 5-7 are a time stamp, comprising hours, minutes, and seconds in the form HH:mm:SS. In one embodiment, the hours, minutes, and seconds are in Greenwich Mean Time. In an alternate embodiment, two bytes could be added to denote the local time zone of the time stamp. In an alternate embodiment, additional bytes could be used to denote fractions of seconds.

Figure 7B:
FIG. 7B, a continuation of FIG. 7A, illustrates Byte-8 of a T-block in the tape blockchain application data of the tape blockchain application specific page within the LTO Cartridge Memory.

FIG. 7B and FIG. 7C continue the description of T-block 70, with the description of the contents of Byte-8. FIG. 7B specifies the numerical identifier in Column 71B and type of hash algorithm in Column 72B associated with the blockchain. For the blockchaining of individual volumes in the same tape cartridge, hash algorithms are identified by a leading zero, such as SHA-224 algorithm identifier (00h), SHA-256 algorithm identifier (01h), SHA-384 algorithm identifier (02h), SHA-512 algorithm identifier (03h), SHA-512/224 algorithm identifier (04h), SHA-512/256 algorithm identifier (05h), and MD5 algorithm identifier (06h) for blockchain information stored directly on the cartridge memory.

For the blockchaining of all the contents of logical partitions in the same tape cartridge, hash algorithms are identified by a leading one, such as SHA-224 algorithm identifier (10h), SHA-256 algorithm identifier (11h), SHA- 384 algorithm identifier (12h), SHA-512 algorithm identifier (13h), SHA-512/224 algorithm identifier (14h), SHA-512/256 algorithm identifier (15h), and MD5 algorithm identifier (16h) for blockchain information stored directly on the cartridge memory.

FIG. 7C specifies the numerical identifier in Column 71C and type of hash algorithm in Column 72C associated with the blockchain. For the blockchaining of all the contents of an entire tape cartridge, hash algorithms are identified by a leading two, such as SHA-224 algorithm identifier (20h), SHA-256 algorithm identifier (21h), SHA-384 algorithm identifier (22h), SHA-512 algorithm identifier (23h), SHA-512/224 algorithm identifier (24h), SHA-512/256 algorithm identifier (25h), and MD5 algorithm identifier (26h) for blockchain information stored directly on the cartridge memory. Hexadecimal numbers 00h-06h, 10h-16h, and 20h-26h denote a cartridge-memory-based Merkle Tree, and we incorporate U.S. Pat. No. 4,309,569 by reference in its entirety.

However, if the blockchain information is to be accessed via the cloud in FIG. 7C, then (FAh) denotes Encryption Key and Link to Encrypted Cloud-based Hash Digest and Identification of hash algorithm used for an individual volume within a tape cartridge, (FBh) denotes Encryption Key and Link to Encrypted Cloud-based Hash Digest and Identification of hash algorithm used for all the contents of a logical partition within a tape cartridge, and (FCh) denotes Encryption Key and Link to Encrypted Cloud-based Hash Digest and Identification of hash algorithm used for all the data contents of an entire tape cartridge. If encryption is not used, then (FDh) denotes use link provided for both hash algorithm used and resulting digest for an individual volume within a tape cartridge, (FEh) denotes use link provided for both hash algorithm used and resulting digest for all the contents of a logical partition within a tape cartridge, and (FFh) denotes use link provided for both hash algorithm used and resulting digest for all the data contents of an entire tape cartridge. Hexadecimal numbers FAh to FFh denote a cloud-based Merkle Tree.

FIG. 7D continues the description of T-block 70, starting at Byte-9 in the tape blockchain application data of the Application Specific Page within the LTO Cartridge Memory. Starting with the numerical value of Byte-9, column 71D, and description in column 72D, is stored the Encryption Key and Link to Encrypted Cloud-based Hash Digest and Identification of hash algorithm used when Byte-8 equals FAh, FBh, or FCh. The Link to Cloud-based Hash Digest and identification of hash algorithm is stored starting with Byte-9 when Byte-8 equals FDh, FEh, or FFh. For blockchain information stored directly in the EEPROM 26 of cartridge memory 20, starting with Byte-9, SHA-224 and SHA-512/224 digests (224 bits or 28-Bytes) use Bytes 9-36 (when Byte-8=00h, 04h, 10h, 14h, 20h, or 24h), SHA-256 and SHA-512/256 digests (256 bits or 32-Bytes) use Bytes 9-40 (when Byte-8=01h, 05h, 11h, 15h, 21h, or 25h), SHA-384 digest (384 bits or 48-Bytes) uses Bytes 9-56 (when Byte-8=02h, 12h, or 22h), SHA-512 digest (512 bits or 64-Bytes) uses Bytes 9-72 (when Byte-8=03h, 13h, or 23h), and MD-5 digest (128 bits or 16-Bytes) uses Bytes 9-24 (when Byte-8=06h, 16h, or 26h). These digests may be calculated by hash ASIC 404, which is resident in host 39, FIG. 2, and described in FIG. 17.

Six data-pointer bytes follow the above information, in FIG. 7D, to point to where the data is stored on the magnetic tape itself. This data-pointer is in bytes 37-42 for SHA-224 and SHA-512/224 (when Byte-8=00h, 04h, 10h, 14h, 20h, or 24h), byte 41-46 for SHA-256 and SHA-512/256 (when Byte-8=01h, 05h, 11h, 15h, 21h, or 25h), byte 57-62 for SHA-384 digest (when Byte-8=02h, 12h, or 22h), byte 73-78 for SHA-512 digest (when Byte-8=03h, 13h, or 23h), and byte 25-30 for MD-5 digest (when Byte-8=06h, 16h, or 26h). The allocation of fewer or more bytes to the data-pointer may be done without loss of generality. This data pointer may include band number and linear position (LPOS) information to locate the associated data object on the magnetic tape. A band is an assembly of data tracks read or written at the same time by the magnetic head in the tape drive. An even number of bands exist along the length the magnetic tape; for each band for I/O being performed from the beginning-of-tape to the end-of-tape, there is another band for I/O being performed from the end-of-tape back to the beginning-of-tape.

A logical-end-of-T-block byte follows the above information. An exemplary logical-end-of-T-block byte is the hexadecimal number "BC" (1011 1100), where "BC" denotes blockchain. As shown in FIG. 7D, this logical-end-of-T-block is in byte 43 for SHA-224 and SHA-512/224 (when Byte-8=00h, 04h, 10h, 14h, 20h, or 24h), byte 47 for SHA-256 and SHA-512/256 (when Byte-8=01h, 05h, 11h, 15h, 21h, or 25h), byte 63 for SHA-384 digest (when Byte-8=02h, 12h, or 22h) which completes two 32-Byte blocks so that no pad bytes are needed, byte 79 for SHA-512 digest (when Byte-8=03h, 13h, or 23h), and byte 31 for MD-5 digest (when Byte-8=06h, 16h, or 26h) which completes the 32-Byte block so that no pad bytes are needed.

The total number of bytes attributed in T-block 70 may be set to a multiple of 32-Bytes, to conform to the 32-Byte block boundaries in the cartridge memory, by appending "pad" Bytes. For example, SHA-224 and SHA-512/224 (both with a 28-Byte hash digest) would have twenty pad Bytes from Bytes 44-63 to complete two 32-Byte blocks comprising T-block 70. SHA-256 and SHA-512/256 (both with a 32-Byte hash digest) would have sixteen pad Bytes from Bytes 48-63 to complete two 32-Byte blocks comprising T-block 70. SHA-384 (48-Byte hash digest) does not need any pad bytes. SHA-512 (64-Byte hash digest) would have sixteen pad Bytes from Bytes 80-95 to complete three 32-Byte blocks comprising T-block 70. MD-5 (16-Byte hash digest) does not need any pad bytes. All of the above examples of "pad" Bytes indicate an even number of pad bytes, so the hexadecimal number DEAD could be used to indicate non-data-bearing pad bytes. Any other hexadecimal string could be used to create pad bytes.

Figure 8:
FIG. 8 illustrates a table of T-Blocks in the tape blockchain application data of the tape blockchain application specific page within the LTO Cartridge Memory.

FIG. 8 illustrates an example set of T-blocks 80 in the Tape Blockchain Application Data of the Blockchain Application Specific Page within the LTO Cartridge Memory 20. Example set of T-blocks 80 comprises a TapeChain Ledger, which is a blockchain ledger applied within the Tape Blockchain Application Data of the Application Specific Page within the LTO Cartridge Memory. Column 81 denotes the ID number of the T-block. Column 82 denotes the number of integral 32-Byte blocks. Column 83 gives the running total of Bytes used, culminating with 1024 bytes, the size of the Tape Blockchain Application Data of the Application Specific Page within the LTO Cartridge Memory. T-blocks using SHA-224, SHA-512/224, SHA-256, SHA-512/256, and SHA-384 all use two 32-Byte blocks, indicating that any combination of these hash algorithms could be used in the set of T-blocks number 1-14. T-block 15 is only one 32-Byte block indicating that the MD-5 hash algorithm is used. T-block 16 is three 32-Byte blocks indicating that the SHA-512 hash algorithm is used. FIG. 8 is only one possible way T-blocks 80 may be arranged. The hash algorithm may be identical in each T-block or each hash algorithm may vary. If there are too many logical partitions, or volumes stacked, to be described with a cartridge-memory based Merkle-Tree, then a cloud-based Merkle-Tree can be used to contain all of the blockchain information.

Figure 9:
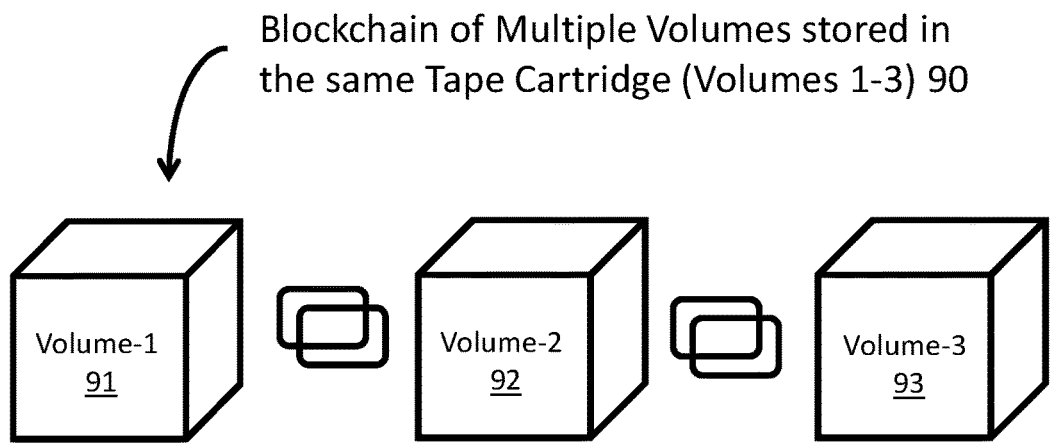
FIG. 9 illustrates the blockchain of multiple volumes stored in the same tape cartridge (volumes 1-3) as would be seen in volume stacking.

FIG. 9 illustrates the blockchain 90 of multiple volumes stored in the same tape cartridge (volumes 1-3) as would be seen in volume stacking. Any data stored on tape is referred to as a volume, and volume stacking refers to storing multiple volumes on the same tape cartridge. The HASH digest in T-block-1 is that of Volume-1 (91), as well as a DATA-pointer to Volume-1 (91) stored on tape reel (13). The HASH digest in T-block-2 is that of Volume-2 (92) and T-block-1, as well as a DATA-pointer to Volume-2 (92) stored on tape reel (13). The HASH digest in T-block-3 is that of Volume-3 (93) and T-block-2, as well as a DATA-pointer to Volume-3 (93) stored on tape reel (13). In summary, except for the very first volume, the blockchaining can be represented by this recursive relation: HASH digest in T-block(j) is that of Volume(j) and T-block(j−1), $2 \leq j \leq N$. In this way, the volumes stacked on the same tape cartridge are blockchained together. These volumes may be spreadsheets of financial information, each representing a quarter of a year of a company's performance, such as 1Q2019, 2Q2019, 3Q2019, etc. These volumes may represent editing versions of the same contract or other legal documents. These volumes may also represent the amalgam of licensing agreements and the PDFs of the patents licensed in that agreement. As shown in FIG. 9, a genesis block 91 starts the blockchain 90 and each block 92 and 93 after the genesis block 91 contains a hash digest based on the portion of the data stored on the reel of magnetic tape and a previous block.

Figure 10:
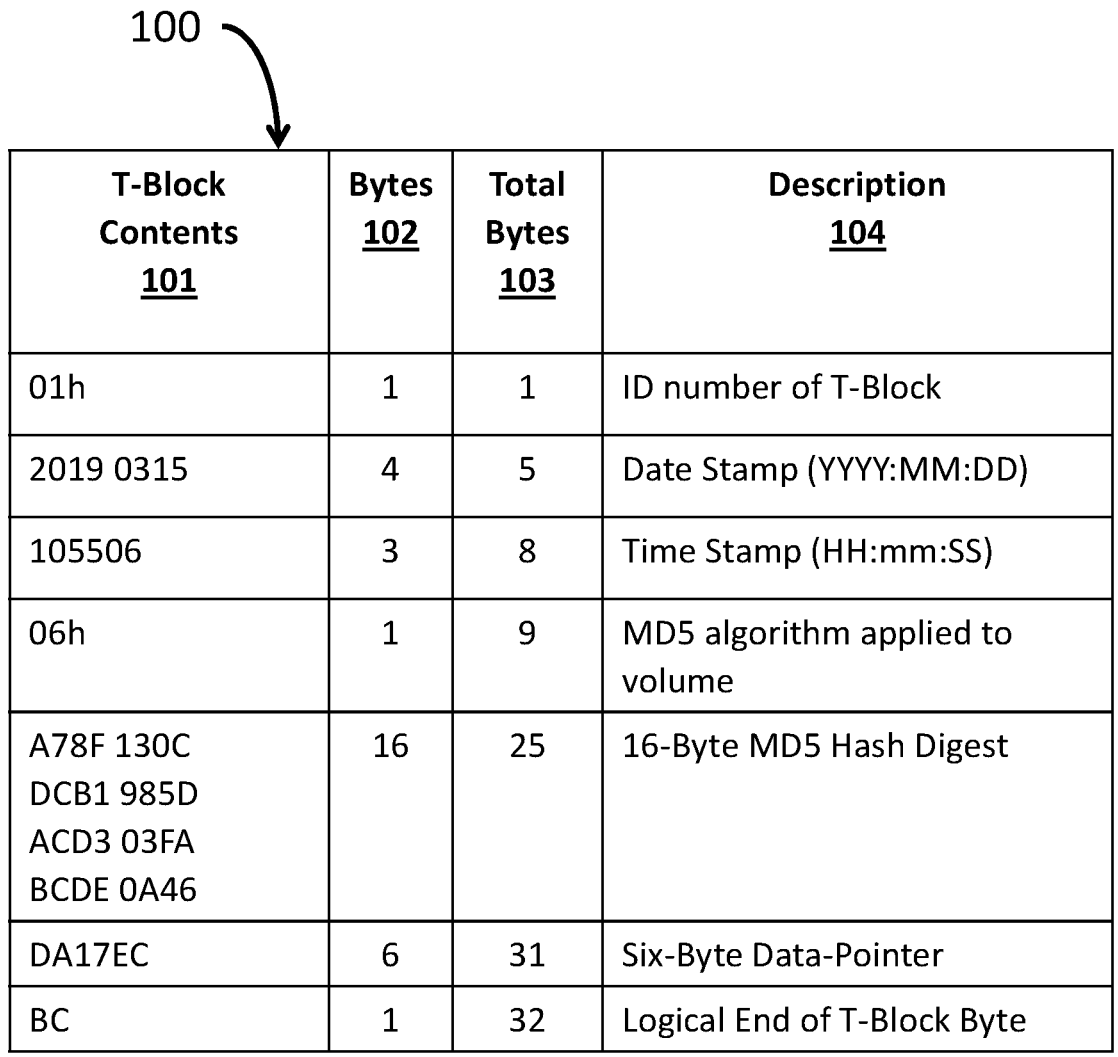
FIG. 10 illustrates a T-block for the blockchaining of volumes stored in the same tape cartridge.

FIG. 10 describes an exemplary T-block 100 that could apply to FIG. 9. Column 101 gives the hexadecimal contents of T-block 100, column 102 gives the incremental bytes used, column 103 gives the running total of bytes used, and column 104 gives the description. In FIG. 10, the first row is that of the ID number of the T-Block, which is 01h and takes one byte. The second row is that of the date stamp and four bytes are used, giving a running total of five bytes (1+4). The third row is that of the time stamp and three bytes are used, giving a running total of eight bytes (1+4+3). Via 06h, the fourth row declares that the MD5 algorithm is applied to a volume, giving a running total of nine bytes (1+4+3+1). The sixteen-byte MD5 hash is shown in row five, giving a running total of twenty-five bytes (1+4+3+1+16). The six-byte data-pointer, is shown in row six with a hexadecimal value of "DA17EC," giving a running total of thirty-one bytes (1+4+3+1+16+6). The logical end of T-block 100 is the one-byte hexadecimal number BC in row six, giving a running total of thirty-two bytes (1+4+3+1+16+6+1), which completes the 32-Byte block.

FIG. 11 illustrates the blockchain 110 of multiple logical partitions within the same tape cartridge (logical partitions 1-3). LTO-5 tape drives and cartridges support two logical partitions. LTO-6, LTO-7, and LTO-8 tape drives and cartridges support four logical partitions. The HASH digest in T-block-1 is that of Logical-Partition-1 (111). The HASH digest in T-block-2 is that of Logical-Partition-2 (112) and T-block-1. The HASH digest in T-block-3 is that of Logical-Partition-3 (113) and T-block-2. In summary, except for the very first logical partition, the blockchaining can be represented by this recursive relation: HASH digest in T-block(j) is that of Logical-Partition(j) and T-block(j−1), $2 \leq j \leq N$. In this way, the logical partitions on the same tape cartridge are blockchained together. These logical partitions may represent all of the legal and financial documents of a company, such as logical-partition-1 contains all the legal and financial documents of a company for 1Q2019, and logical-partition-2 contains all the legal and financial documents of a company for 2Q2019, etc. This would allow for faster access to all necessary documents for any audits.

Figure 12:
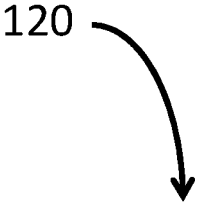
FIG. 12 illustrates a T-block for the blockchaining of logical volumes stored in the same tape cartridge.

FIG. 12 describes an exemplary T-block 120 which could apply to FIG. 11. Column 121 gives the hexadecimal contents of T-block 120, column 122 gives the incremental bytes used, column 123 gives the running total of bytes used, and column 124 gives the description. In FIG. 12, the first row is that of the ID number of the T-Block, which is 01h and takes one byte. The second row is that of the date stamp and four bytes are used, giving a running total of five bytes (1+4). The third row is that of the time stamp and three bytes are used, giving a running total of eight bytes (1+4+3). Via 16h, the fourth row declares that the MD5 algorithm is applied to a logical partition, giving a running total of nine bytes (1+4+3+1). The sixteen-byte MD5 hash is shown in row five, giving a running total of twenty-five bytes (1+4+3+1+16). The six-byte data-pointer, is shown in row six with a hexadecimal value of "DA17EC," giving a running total of thirty-one bytes (1+4+3+1+16+6). The logical end of T-block 100 is the one-byte hexadecimal number BC in row six, giving a running total of thirty-two bytes (1+4+3+1+16+6+1), which completes the 32-Byte block.

FIG. 13 describes illustrates the blockchain 130 of multiple tape cartridges within tape cartridges in a GEOPLEX (cartridges 1-3). A GEOPLEX is a geographically diverse storage of copies of storage, in case of a natural disaster, catastrophic fire, etc. In The HASH digest in T-block-1 of cartridge-1 is of the data contents of the entire cartridge (131). The HASH digest in T-block-1 of cartridge-2 is that of the data contents of "copy" cartridge-2 (132) and T-block-1 of cartridge-1. The HASH digest in T-block-1 of cartridge-3 is that of the data contents of "copy" cartridge-3 (133) and T-block-1 of cartridge-1. In other words, the Merkle tree of FIG. 13 is branched, with cartridge-1 being the "trunk" and "copies" cartridge-2 and cartridge-3 are the "branches." The GEOPLEX system includes a first magnetic tape cartridge 1 located at a first geographic location and a second magnetic tape cartridge 2 or 3 located at a second geographic location. The first magnetic tape cartridge 1 has a first solid-state cartridge memory, a first reel of magnetic tape containing data, and a first blockchain block 131 stored in the first solid-state cartridge memory. The first blockchain block 131 contains a first hash digest of the data stored on the first reel of magnetic tape and a data pointer linking to the data stored on the first reel of magnetic tape. The second magnetic tape cartridge 2 or 3 has a second solid-state cartridge memory, a second reel of magnetic tape containing data, and a second blockchain block 132 or 133 stored in the second solid-state cartridge memory. The second blockchain block 132 or 133 contains a second hash digest based on the data stored on the second reel of magnetic tape and the first blockchain block. The second blockchain block 132 or 133 also contains a data pointer linking to the data stored on the second reel of magnetic tape. The data upon which the first hash digest is based is not redundantly stored in the first solid-state cartridge memory with the first blockchain block 131. The data upon which the second hash digest is based is not redundantly stored in the second solid-state cartridge memory with the second blockchain block 132 or 133. The first magnetic tape cartridge has a first table stored in the first solid-state cartridge memory that is compliant with the Linear Tape-Open standard. The first blockchain block 131 is stored in the table in an application specific page. The second magnetic tape cartridge has a second table stored in the second solid-state cartridge memory that is compliant with the Linear Tape-Open standard. The second blockchain block 132 or 133 is stored in the second table in an application specific page. The first blockchain block 131 and second blockchain block 132 or 133 contain an algorithm identifier identifying a hash algorithm used to hash the data from the first reel of magnetic tape such as SHA-224, SHA-256, SHA-384, SHA-512, SHA-512/224, SHA-512-256, and MD5. Alternatively, the first blockchain block 131 and second blockchain block 132 or 133 contain an encryption key and link to an encrypted cloud-based hash digest and an identification of a hash algorithm used to hash the data from the first reel of magnetic tape. The first and second geographic locations are separated by at least 100 miles. The GEOPLEX system may also include a magnetic tape cartridge reader 30 (shown in FIG. 2) that accesses the data stored on the first reel of magnetic tape 1 and the first blockchain block 131 stored on the first solid-state cartridge memory. The magnetic tape cartridge reader 30 forms a new hash digest of the data stored on the first reel of magnetic tape and compares it to the first hash digest contained within the first blockchain block 131. The magnetic tape cartridge reader 30 approves the data for use from the new hash digest and first hash digest match. The magnetic tape cartridge reader 30 accesses the second magnetic tape cartridge 2 or 3 for data retrieval when the new hash digest and first hash digest do not match.

FIG. 14 describes illustrates the blockchain 140 of multiple tape cartridges used for volume spanning (cartridges 1-3). Volume spanning involves data too large to fit on a single tape cartridge, for example a digital movie. The HASH digest in T-block-1 of cartridge-1 is of the data contents of the entire cartridge (141). The HASH digest in T-block-1 of cartridge-2 is that of the data contents of cartridge-2 (142) and T-block-1 of cartridge-1. The HASH digest in T-block-1 of cartridge-3 is that of the data contents of cartridge-3 (143) and T-block-1 of cartridge-2. In summary, except for the very first tape cartridge, the blockchaining can be represented by this recursive relation: HASH digest in T-block(j) of Cartridge(j) is that of the data in Cartridge(j) and T-block(1) of Cartridge(j-1), $2 \leq j \leq N$.

FIG. 15 describes an exemplary T-block 150 which could apply to FIGS. 13 and 14. Column 151 gives the hexadecimal contents of T-block 150, column 152 gives the incremental bytes used, column 153 gives the running total of bytes used, and column 154 gives the description. In FIG. 15, the first row is that of the ID number of the T-Block, which is 01h and takes one byte. The second row is that of the date stamp and four bytes are used, giving a running total of five bytes (1+4). The third row is that of the time stamp and three bytes are used, giving a running total of eight bytes (1+4+3). Via 26h, the fourth row declares that the MD5 algorithm is applied to the data contents of the entire tape cartridge, giving a running total of nine bytes (1+4+3+1). The sixteen-byte MD5 hash is shown in row five, giving a running total of twenty-five bytes (1+4+3+1+16). The six-byte data-pointer, is shown in row six with a hexadecimal value of "DA17EC," giving a running total of thirty-one bytes (1+4+3+1+16+6). The logical end of T-block 100 is the one-byte hexadecimal number BC in row six, giving a running total of thirty-two bytes (1+4+3+1+16+6+1), which completes the 32-Byte block.

Figure 16A:
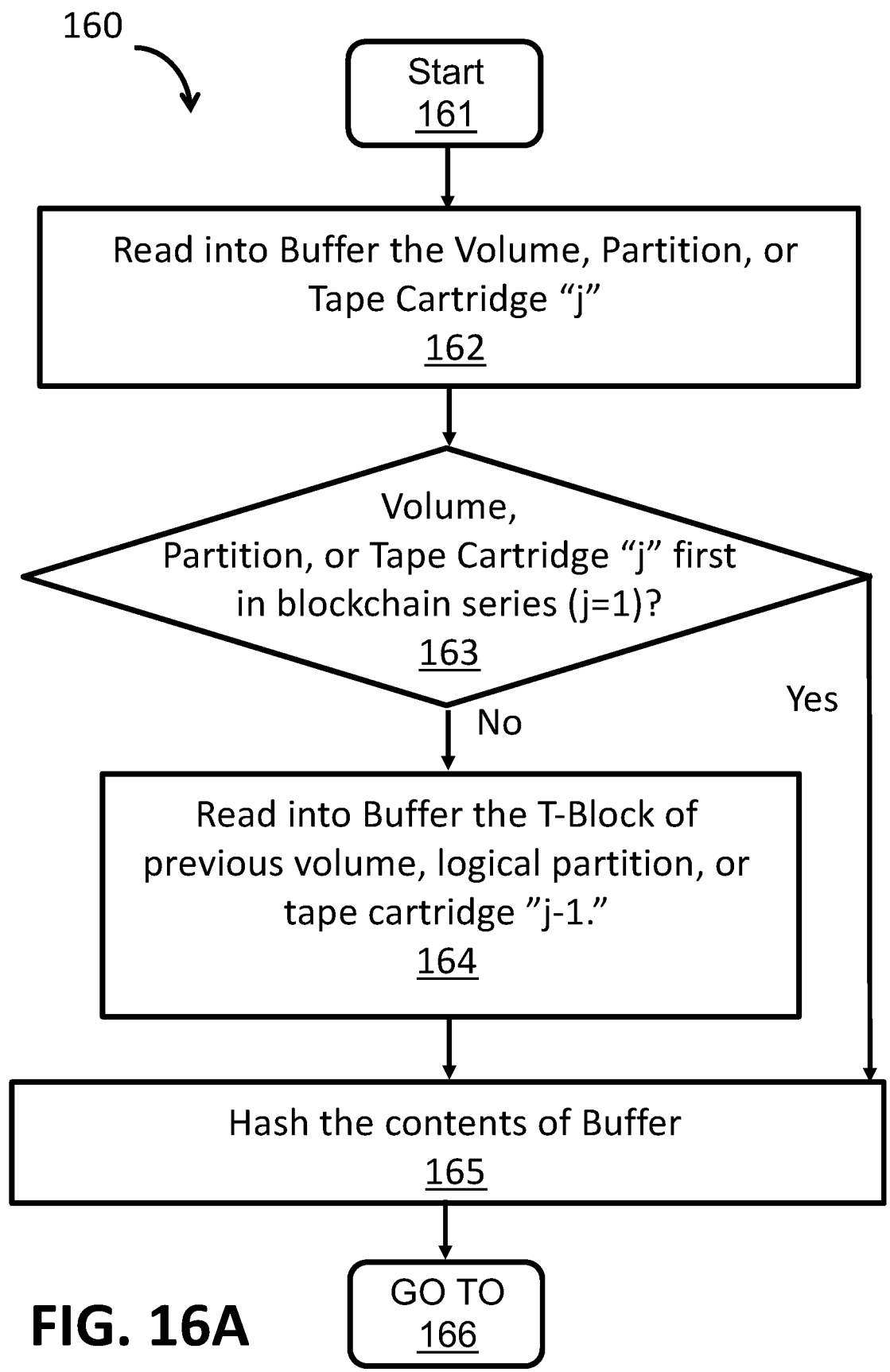
FIG. 16A is a flowchart for BlockChainVerify.
Figure 16B:
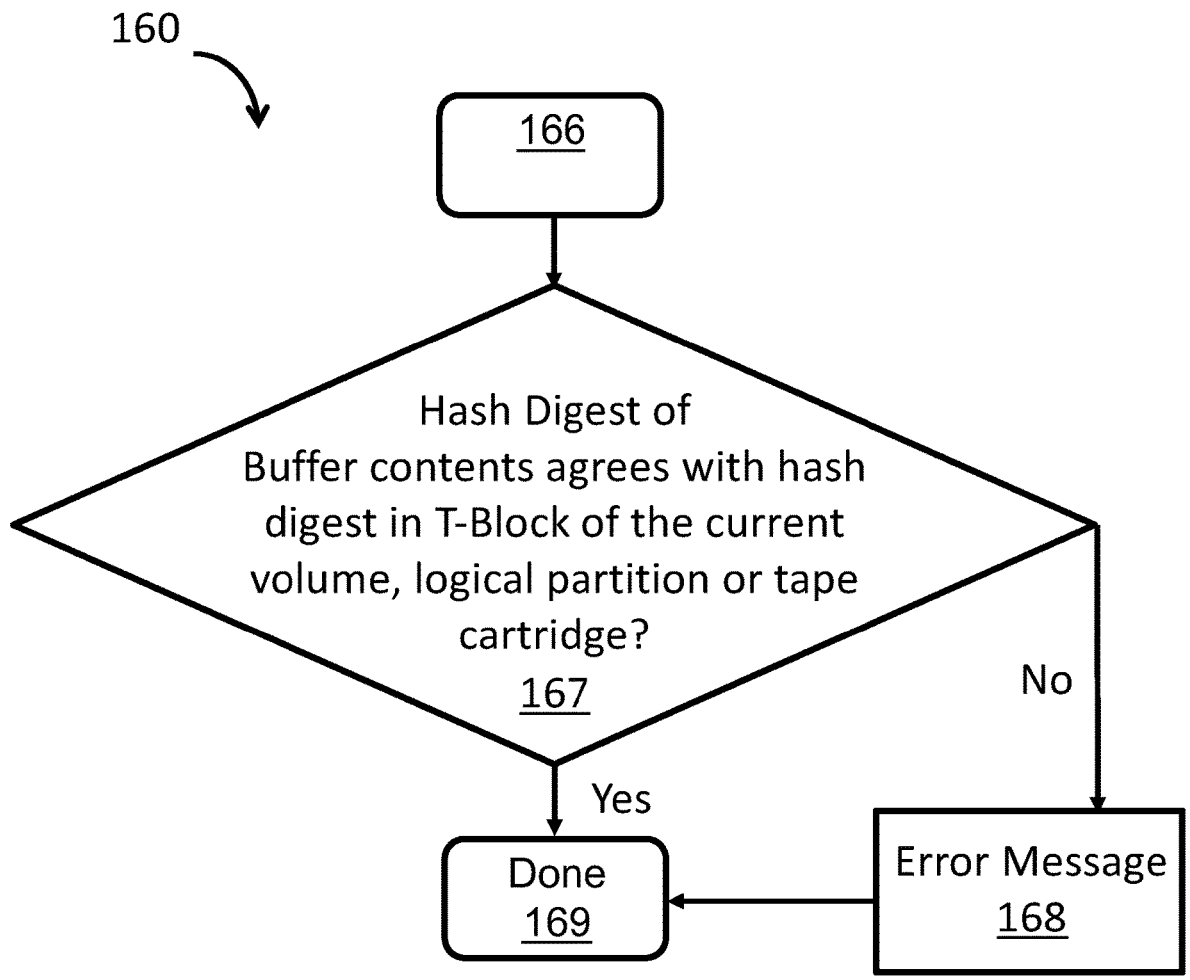
FIG. 16B is a continuation of FIG. 16A of a flowchart for BlockChainVerify.

FIGS. 16A and 16B describe flowchart for BlockChain-Verify 160. Starting in step 161, FIG. 16A, the process flows to step 162, where the contents of volume, partition, or tape cartridge "j" are read into a buffer, $1 \leq j \leq N$. In step 163, the decision is made whether volume, logical-partition, or tape-cartridge "N" is first in the blockchain series, j=1. If yes, the process flows to step 165 and the contents of the buffer are hashed. If no, in step 165, read into the buffer the T-Block of previous blockchained volume, logical partition or tape cartridge "j−1" before hashing the contents of the buffer in step 165. Then go to step 166. In FIG. 16B, in step 167, compare the contents of the hash digest of the buffer contents with hash digest in T-Block of the current volume, logical partition or tape cartridge. If they agree in step 167, then the BlockChainVerification is successful and the process concludes in step 169. If they disagree in step 167, then the BlockChainVerification failed and an error message is sent in step 168. As discussed with respect to FIG. 13, the GEOPLEX system may also include a magnetic tape cartridge reader 30 (shown in FIG. 2) that accesses the data stored on the first reel of magnetic tape 1 and the first blockchain block 131 stored on the first solid-state cartridge memory. The GEOPLEX system, using reader 30m will the perform a BlockChainVerify operation 160 in accordance with FIGS. 16A and 16B, discussed as follows. The magnetic tape cartridge reader 30 forms a new hash digest of the data stored on the first reel of magnetic tape and compares it to the first hash digest contained within the first blockchain block 131. The magnetic tape cartridge reader 30 approves the data for use from the new hash digest and first hash digest match. The magnetic tape cartridge reader 30 accesses the second magnetic tape cartridge 2 or 3 for data retrieval when the new hash digest and first hash digest do not match. FIGS. 16A and 16B provide the capstone process for maintaining data integrity on a magnetic tape cartridge 10. The method includes storing data on a magnetic tape reel 13 of a magnetic tape cartridge 10 and creating a hash digest based on a portion of the data from the magnetic tape reel 13 (see FIGS. 9-13). The method also generates a data pointer linking to the portion of the data on the magnetic tape reel 13 and forms a blockchain block including the hash digest and the data pointer (see FIGS. 9-13). Then the method stores the blockchain block or blockchain 17 within a solid-state cartridge memory 20 of the magnetic tape cartridge 10. The blockchain block or blockchain 17 is stored within the solid-state cartridge memory 20 of the magnetic tape cartridge 10 without redundantly storing the portion of data within the solid-state cartridge memory 20. This method stores the blockchain block or blockchain 17 in a page contained within a table 40 stored within the solid-state cartridge memory 20 of the magnetic tape cartridge 10. This table is compliant with the Linear Tape-Open (LTO) standard where the page allocated for blockchain data is an application specific page that is left open within the LTO standard. The portion of data may be a logical volume, a logical partition, or all data contained within the magnetic tape reel. The method may also store within the blockchain block or blockchain 17 an algorithm identifier identifying a hash algorithm used to hash the portion of the data from the reel of magnetic tape such as SHA-224, SHA-256, SHA-384, SHA-512, SHA-512/224, SHA-512-256, and MD5. Alternatively, the method may store within the blockchain block or blockchain 17 an encryption key and link to an encrypted cloud-based hash digest and an identification of a hash algorithm used to hash the portion of the data from the reel of magnetic tape. Then for confirming data integrity, the method will place the magnetic tape cartridge 10 into a magnetic tape cartridge reader 30 and read the blockchain block or blockchain 17 from solid-state cartridge memory 20 the into the memory of the magnetic tape cartridge reader 30 pursuant to the process of FIGS. 16A and 16B. The method will also access the hash digest and data pointer included within the blockchain block and use the accessed data pointer to access the linked portion of data stored on the magnetic tape reel 13. Next, the method will read the portion of data stored on the magnetic tape reel 13 into the memory of the magnetic tape cartridge reader 30 and generate a new hash digest of the portion of data read into the memory of the magnetic tape cartridge reader 30. Then, the method will compare the new hash digest generated by the magnetic tape cartridge reader 30 to the hash digest included within the blockchain block. At this point the method may approve the portion of data for use when the new hash digest generated by the magnetic tape cartridge reader matches the hash digest included within the blockchain block. Alternatively, the method may generate an error message when the new hash digest generated by the magnetic tape cartridge reader does not match the hash digest included within the blockchain block as noted in process 168 of FIG. 16B.

Figure 17:
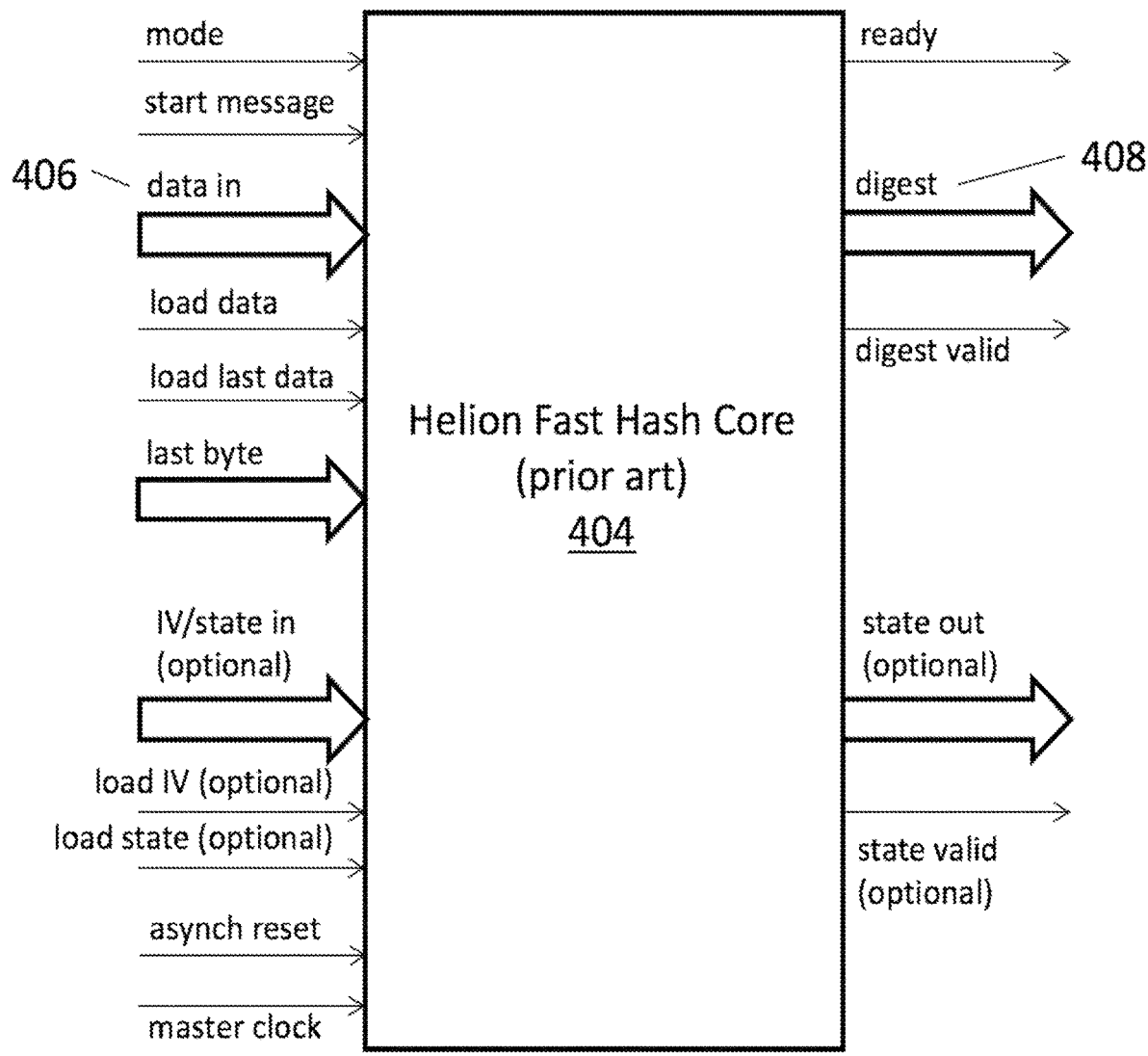
FIG. 17 illustrates a prior-art diagram of the Helion Fast Hash Core Application Specific Integrated Circuit (ASIC)

FIG. 17 illustrates a prior-art diagram of the Helion Fast Hash Core Application Specific Integrated Circuit (ASIC) 404, which may be resident in host 39. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data to be stored on tape is fed into this ASIC at 406 and the resulting blockchain hash digest output is 408. Such dedicated Hash Core ASICs have faster performance than software running in a cloud or computer memory under an operating system. ASIC 404 could calculate the digest starting with byte 9 in FIG. 7D.

Figure 18:
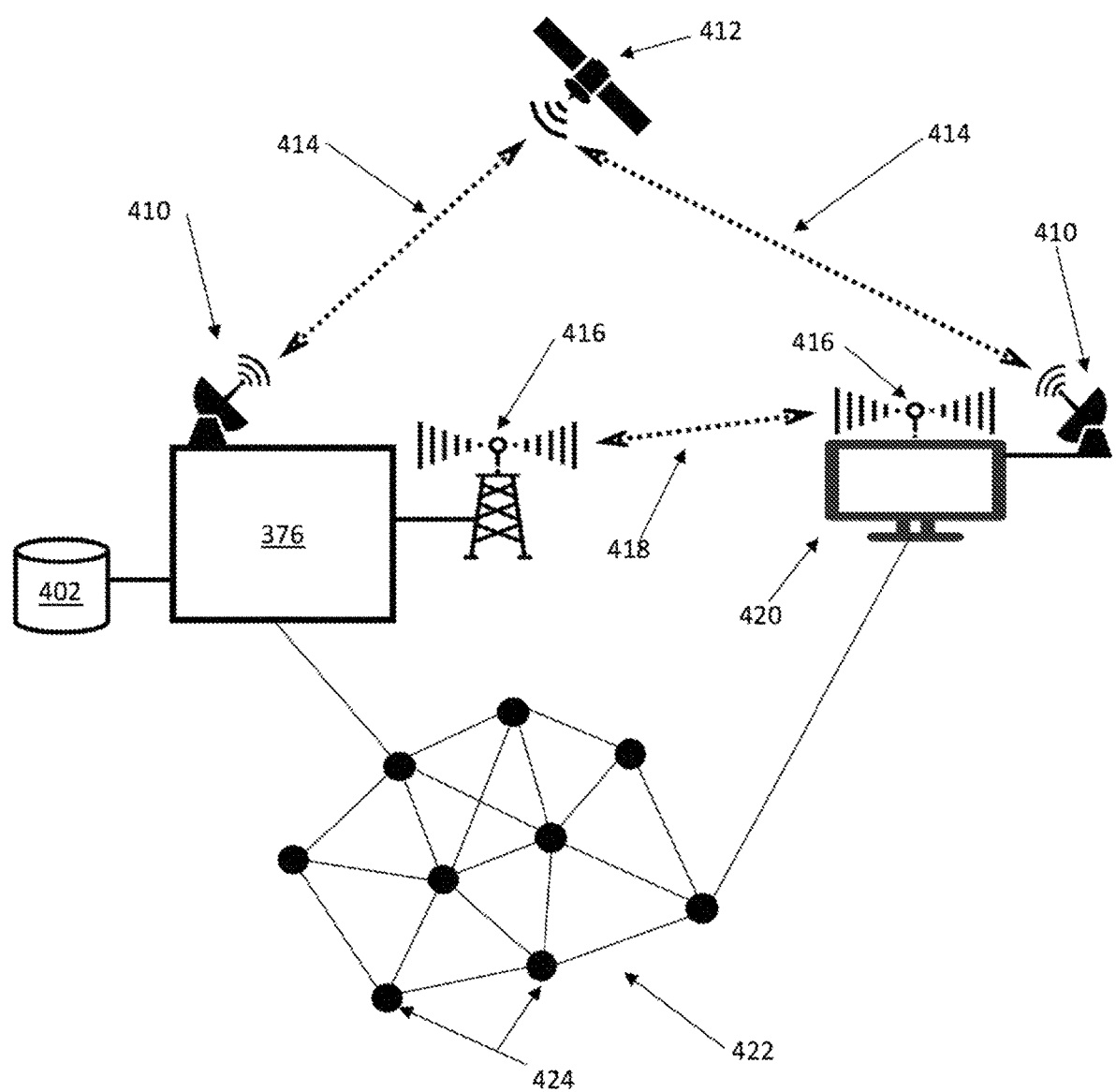
FIG. 18 illustrates an exemplary communications network for transmission of an electronic digital file and associated metadata via satellite communications links, wireless terrestrial communications links, and communications links provided by a distributed network.

FIG. 18 illustrates an exemplary communications network for transmission of an electronic digital file stored as data on a magnetic tape cartridge 10 via satellite communications links 414, wireless terrestrial communications links 418, and communications links provided by a distributed network 422. A tape storage host 376, such as host 39, is shown connected to a node of a distributed network 422 and a tape library 402 (shown in FIG. 2). Tape library may contain any number of magnetic tape cartridges 10. The sender node may be limited to a permitted user, one with credentials stored in wallet 401 in host 39, FIG. 2. Wallet 401 contains a listing of credentials as to what persons or machines may access library 402. Host 376 is coupled to tape storage, such as one or more tape drives 38A clustered in an automated tape library 402, as in FIG. 2. Host 376 is also coupled to a satellite transmission system 410 that may transmit signals bidirectionally across communications link 414 through a satellite 412 to a user node 420 that is depicted as having a conventional display device, such as a computer terminal, mobile electronic device, television, movie display, or other media display device. User node 420 includes a satellite transmission system 410 that is capable of bidirectional communication with satellite 412 in order to receive the data from the host 376. Host 376 is also coupled to a terrestrial wireless transmission antenna 416 that sends communications bidirectionally across a communications link 418 with a terrestrial wireless transmission antenna 416 located at user node 420 enabling the bidirectional transmission of data between host 376 and user node 420. Host 376 and user node 420 are also both coupled to a distributed network 422, such as the Internet, allowing for the bidirectional transmission of data between host 376 and user node 420.

While the invention has been shown and described with reference to a particular embodiment thereof, it will be understood to those skilled in the art, that various changes in form and details may be made therein without departing from the spirit and scope of the invention.

The invention claimed is:

1. A magnetic tape cartridge secured with a blockchain, comprising:
   a solid-state cartridge memory;
   a reel of magnetic tape containing data; and
   a blockchain comprised of a series of blocks, each block containing a blockchain hash digest based on a portion of the data stored on the reel of magnetic tape and data pointers that link that portion of data stored on the reel of magnetic tape to each respective block, wherein the blockchain blocks are stored in the solid-state cartridge memory.

2. The magnetic tape cartridge secured with a blockchain of claim 1, wherein the portion of data upon which the blockchain hash digest is based is not redundantly stored in the solid-state cartridge memory with the block.

3. The magnetic tape cartridge secured with a blockchain of claim 2, wherein the portion of data is a logical volume, a logical partition, or all data stored on the reel of magnetic tape.

4. The magnetic tape cartridge secured with a blockchain of claim 3, further comprising a table containing pages stored within the solid-state cartridge memory, one of the pages being allocated for containing the blockchain.

5. The magnetic tape cartridge secured with a blockchain of claim 4, wherein the table is compliant with the Linear Tape-Open (LTO) standard, wherein the page allocated for blockchain data is an application specific page that is left open within the LTO standard, wherein the data stored on the reel of magnetic tape is stored with an LTO format that is not altered by the blockchain due to the storage of the blockchain in the solid-state cartridge memory and the use of data pointers to link to the data on the reel of magnetic tape to the blockchain.

6. The magnetic tape cartridge secured with a blockchain of claim 5, wherein the blockchain contains an algorithm identifier identifying a hash algorithm used to hash the portion of the data from the reel of magnetic tape selected from a group consisting of SHA-224, SHA-256, SHA-384, SHA-512, SHA-512/224, SHA-512-256, and MD5, or wherein the blockchain contains an encryption key and link to an encrypted cloud-based blockchain hash digest and an identification of a hash algorithm used to hash the portion of the data from the reel of magnetic tape.

7. The magnetic tape cartridge secured with a blockchain of claim 6, wherein each blockchain block contains a logical end byte and pad bytes, wherein the storage of the blockchain within the table forms a ledger recording information about the data on the reel of magnetic tape.

8. The magnetic tape cartridge secured with a blockchain of claim 7, wherein a genesis block starts the blockchain, wherein each block after the genesis block contains a blockchain hash digest based on the portion of the data stored on the reel of magnetic tape and a previous block.

9. A method for maintaining data integrity on a magnetic tape cartridge, comprising:
   storing data on a magnetic tape reel of a magnetic tape cartridge;
   creating a blockchain hash digest based on a portion of the data from the magnetic tape reel;
   generating a data pointer linking to the portion of the data on the magnetic tape reel;
   forming a blockchain block including the blockchain hash digest and the data pointer; and
   storing the blockchain block within a solid-state cartridge memory of the magnetic tape cartridge.

10. The method for maintaining data integrity on a magnetic tape cartridge of claim 9, wherein the blockchain block is stored within the solid-state cartridge memory of the magnetic tape cartridge without redundantly storing the portion of data within the solid-state cartridge memory.

11. The method for maintaining data integrity on a magnetic tape cartridge of claim 10, further comprising storing the blockchain block in a page contained within a table stored within the solid-state cartridge memory of the magnetic tape cartridge, wherein the table is compliant with the Linear Tape-Open (LTO) standard, wherein the page allocated for blockchain data is an application specific page that is left open within the LTO standard.

12. The method for maintaining data integrity on a magnetic tape cartridge of claim 11, wherein the portion of data is a logical volume, a logical partition, or all data contained within the magnetic tape reel.

13. The method for maintaining data integrity on a magnetic tape cartridge of claim 12, further comprising storing within the blockchain block an algorithm identifier identifying a hash algorithm used to hash the portion of the data from the reel of magnetic tape selected from a group consisting of SHA-224, SHA-256, SHA-384, SHA-512, SHA-512/224, SHA-512-256, and MD5, or storing within the blockchain block an encryption key and link to an encrypted cloud-based blockchain hash digest and an identification of a hash algorithm used to hash the portion of the data from the reel of magnetic tape.

14. The method for maintaining data integrity on a magnetic tape cartridge of claim 13, further comprising:
  placing the magnetic tape cartridge into a magnetic tape cartridge reader;
  reading the blockchain block from solid-state cartridge memory the into the memory of the magnetic tape cartridge reader;
  accessing the blockchain hash digest and data pointer included within the blockchain block;
  using the accessed data pointer to access the linked portion of data stored on the magnetic tape reel;
  reading the portion of data stored on the magnetic tape reel into the memory of the magnetic tape cartridge reader;
  generating a new blockchain hash digest of the portion of data read into the memory of the magnetic tape cartridge reader;
  comparing the new blockchain hash digest generated by the magnetic tape cartridge reader to the blockchain hash digest included within the blockchain block;
  approving the portion of data for use when the new blockchain hash digest generated by the magnetic tape cartridge reader matches the blockchain hash digest included within the blockchain block; and
  generating an error message when the new blockchain hash digest generated by the magnetic tape cartridge reader does not match the blockchain hash digest included within the blockchain block.

15. A geographically diverse magnetic tape cartridge GEOPLEX system secured with blockchain for data disaster recovery, comprising:
  a first magnetic tape cartridge located at a first geographic location, the first magnetic tape cartridge having a first solid-state cartridge memory, a first reel of magnetic tape containing data, and a first blockchain block stored in the first solid-state cartridge memory, the first blockchain block containing a first blockchain hash digest of the data stored on the first reel of magnetic tape and a data pointer linking to the data stored on the first reel of magnetic tape; and
  a second magnetic tape cartridge located at a second geographic location, the second magnetic tape cartridge having a second solid-state cartridge memory, a second reel of magnetic tape containing data, and a second blockchain block stored in the second solid-state cartridge memory, the second blockchain block containing a second blockchain hash digest based on the data stored on the second reel of magnetic tape and the first blockchain block, the second blockchain block also containing a data pointer linking to the data stored on the second reel of magnetic tape.

16. The geographically diverse magnetic tape cartridge GEOPLEX system secured with blockchain for data disaster recovery of claim 15, wherein the data upon which the first blockchain hash digest is based is not redundantly stored in the first solid-state cartridge memory with the first blockchain block, wherein the data upon which the second blockchain hash digest is based is not redundantly stored in the second solid-state cartridge memory with the second blockchain block.

17. The geographically diverse magnetic tape cartridge GEOPLEX system secured with blockchain for data disaster recovery of claim 16, wherein the first magnetic tape cartridge further comprises a first table stored in the first solid-state cartridge memory that is compliant with the Linear Tape-Open standard, wherein the first blockchain block is stored in the table in an application specific page, wherein the second magnetic tape cartridge further comprises a second table stored in the second solid-state cartridge memory that is compliant with the Linear Tape-Open standard, wherein the second blockchain block is stored in the second table in an application specific page.

18. The geographically diverse magnetic tape cartridge GEOPLEX system secured with blockchain for data disaster recovery of claim 17, wherein the first blockchain block contains an algorithm identifier identifying a hash algorithm used to hash the data from the first reel of magnetic tape selected from a group consisting of SHA-224, SHA-256, SHA-384, SHA-512, SHA-512/224, SHA-512-256, and MD5, or wherein the first blockchain block contains an encryption key and link to an encrypted cloud-based blockchain hash digest and an identification of a hash algorithm used to hash the data from the first reel of magnetic tape, wherein the second blockchain block contains an algorithm identifier identifying a hash algorithm used to hash the data from the second reel of magnetic tape selected from a group consisting of SHA-224, SHA-256, SHA-384, SHA-512, SHA-512/224, SHA-512-256, and MD5, or wherein the second blockchain block contains an encryption key and link to an encrypted cloud-based blockchain hash digest and an identification of a hash algorithm used to hash the data from the second reel of magnetic tape.

19. The geographically diverse magnetic tape cartridge GEOPLEX system secured with blockchain for data disaster recovery of claim 18, wherein the first and second geographic locations are separated by at least 100 miles.

20. The geographically diverse magnetic tape cartridge GEOPLEX system secured with blockchain for data disaster recovery of claim 19, further comprising a magnetic tape cartridge reader that accesses the data stored on the first reel of magnetic tape and the first blockchain block stored on the first solid-state cartridge memory, wherein the magnetic tape cartridge reader forms a new blockchain hash digest of the data stored on the first reel of magnetic tape and compares it to the first blockchain hash digest contained within the first blockchain block, wherein the magnetic tape cartridge reader approves the data for use from the new blockchain hash digest and first blockchain hash digest match, wherein the magnetic tape cartridge reader accesses the second magnetic tape cartridge for data retrieval when the new blockchain hash digest and first blockchain hash digest do not match.

\* \* \* \* \*